(12) United States Patent
Ko et al.

(10) Patent No.: US 11,163,404 B2
(45) Date of Patent: Nov. 2, 2021

(54) DEVICE AND METHOD FOR COMPENSATING FOR TEMPERATURE CHANGE IN STRAIN-GAUGE PRESSURE SENSOR AND METHOD FOR IMPLEMENTING STRAIN-GAUGE PRESSURE FROM TOUCHSCREEN ELEMENT

(71) Applicant: Samsung Electronics Co., Ltd., Suwon-si (KR)

(72) Inventors: Seunghoon Ko, Suwon-si (KR); Bongjun Ko, Suwon-si (KR); Aram Song, Suwon-si (KR); Hoondo Heo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/361,911

(22) Filed: Mar. 22, 2019

(65) Prior Publication Data

US 2019/0294275 A1 Sep. 26, 2019

(30) Foreign Application Priority Data

Mar. 23, 2018 (KR) .................. 10-2018-0033823

(51) Int. Cl.
*G06F 3/044* (2006.01)
*G06F 3/01* (2006.01)

(52) U.S. Cl.
CPC .............. *G06F 3/044* (2013.01); *G06F 3/016* (2013.01); *G06F 2203/04105* (2013.01)

(58) Field of Classification Search
CPC .......... G06F 3/016; G06F 2203/04105; G06F 3/044–3/045
See application file for complete search history.

(56) References Cited

U.S. PATENT DOCUMENTS

| 2015/0091857 A1 | 4/2015 | Rosenberg et al. |
| 2016/0216836 A1 | 7/2016 | Yao et al. |
| 2016/0282999 A1 | 9/2016 | Hwang et al. |

(Continued)

FOREIGN PATENT DOCUMENTS

| WO | 2016/089149 A1 | 6/2016 |
| WO | 2018/043588 A1 | 3/2018 |

OTHER PUBLICATIONS

International Search report dated Jul. 2, 2019, issued in the International application No. PCT/KR2019/003382.

(Continued)

*Primary Examiner* — Alexander Eisen
*Assistant Examiner* — Nathaniel P Brittingham
(74) *Attorney, Agent, or Firm* — Jefferson IP Law, LLP

(57) ABSTRACT

An electronic device is provided. The electronic device includes a sensor layer including a first channel including one or more first electrodes and a second channel including one or more second electrodes and a control circuit configured to detect touch information corresponding to an input of an external object to the sensor layer based on a change in capacitance between at least one of the one or more first electrodes and at least one of the one or more second electrodes and detect pressure information corresponding to the input based on a resistance changed by the input to at least one of the first channel or the second channel.

14 Claims, 36 Drawing Sheets

(56) References Cited

U.S. PATENT DOCUMENTS

| | | | |
|---|---|---|---|
| 2016/0349907 A1* | 12/2016 | Kobayashi | G06F 3/0446 |
| 2017/0300161 A1 | 10/2017 | Filiz et al. | |
| 2017/0315658 A1 | 11/2017 | Vandermeijden et al. | |
| 2017/0336891 A1 | 11/2017 | Rosenberg et al. | |
| 2017/0351354 A1 | 12/2017 | Yoon | |
| 2017/0364191 A1 | 12/2017 | Jiang et al. | |
| 2018/0081478 A1 | 3/2018 | Hong et al. | |
| 2019/0317641 A1 | 10/2019 | Maruyama et al. | |

OTHER PUBLICATIONS

Extended European Search Report dated Apr. 26, 2021, issued in European Patent Application No. 19772618.5.

* cited by examiner

DEVICE AND METHOD FOR COMPENSATING FOR TEMPERATURE CHANGE IN STRAIN-GAUGE PRESSURE SENSOR AND METHOD FOR IMPLEMENTING STRAIN-GAUGE PRESSURE FROM TOUCHSCREEN ELEMENT

CROSS-REFERENCE TO RELATED APPLICATION(S)

This application is based on and claims priority under 35 U.S.C. § 119(a) of a Korean patent application number 10-2018-0033823, filed on Mar. 23, 2018, in the Korean Intellectual Property Office, the disclosure of which is incorporated by reference herein in its entirety.

BACKGROUND

1. Field

The disclosure relates to electronic devices with a sensor layer for detecting touch information and pressure information and methods for operating the same. More particularly, the disclosure relates to electronic devices for measuring the position and pressure of a touch on the sensor layer and methods for operating the same.

2. Description of Related Art

Touchscreen-equipped electronic devices are gaining popularity. An electronic device may display object-containing screens on the touchscreen. A user may touch a point on the touchscreen using their finger or a stylus pen. The electronic device may detect the position of the touch on the touchscreen. The electronic device may perform the function associated with the object corresponding to the detected position and may provide a user-friendly user interface to allow the user to manipulate the electronic device by mere touch.

The touch panel included in the touchscreen may include a plurality of electrodes. The electrodes may be conductors. Thus, mutual capacitance may occur between the electrodes. For example, when the touch panel is implemented as a capacitive touch panel, the electronic device may apply a driving signal to at least one electrode, the so-called driving electrode, of the touch panel. The driving electrode may generate an electric field. The other electrodes may output electrical signals based on the electric field generated by the driving electrode. Meanwhile, when the user brings their finger or fingers close to one electrode, the magnitude of the electrical signal that the electrode outputs may be changed. The electronic device may detect the change in the mutual capacitance due to the changed magnitude and detect the position of the touch based on the electrodes where mutual capacitance is changed.

Electronic devices that have been recently released on the market are able to measure the pressure of a touch, as well as the position. To identify the magnitude of pressure, the electronic devices include a separate layer for measuring the magnitude of pressure in addition to a touch panel with electrodes. This leads to an increase in the overall size, thickness, weight, and manufacturing costs.

Therefore, a need exists for electronic devices for measuring the position and pressure of a touch on the sensor layer and methods for operating the same.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide an electronic device capable of measuring the position and pressure of a touch without any separate pressure detecting layer, as well as a method for operating the electronic device. The electronic device may detect the position of a touch based on mutual capacitance and may detect the magnitude of the pressure of the touch based on a change in resistance due to pressure on the same electrodes.

Additional aspects will be set forth in part in the description which follows and, in part, will be apparent from the description, or may be learned by practice of the presented embodiments.

In accordance with an aspect of the disclosure, an electronic device is provided. The electronic device measures changes in the resistance of electrodes based on the parameter corresponding to the difference in resistance between two electrodes having the same or similar temperature coefficients, free from variables that result from temperature. As such, the electronic device may more accurately measure pressure by eliminating variables attributed to temperature.

In accordance with another aspect of the disclosure, an electronic device is provided. The electronic device includes a sensor layer, which includes a first channel including one or more first electrodes and a second channel including one or more second electrodes, and a control circuit configured to detect touch information corresponding to an input of an external object to the sensor layer based on a change in capacitance between at least one of the one or more first electrodes and at least one of the one or more second electrodes and detect pressure information corresponding to the input based on a resistance changed by the input to at least one of the first channel or the second channel.

In accordance with another aspect of the disclosure, a method for operating an electronic device including a sensor layer including a first channel including one or more first electrodes and a second channel including one or more second electrodes is provided. The method includes detecting touch information corresponding to an input of an external object to the sensor layer based on a change in capacitance between at least one of the one or more first electrodes and at least one of the one or more second electrodes, and detecting pressure information corresponding to the input based on a resistance changed by the input to at least one of the first channel or the second channel.

In accordance with another aspect of the disclosure, an electronic device is provided. The electronic device includes a sensor layer including a plurality of electrodes and a control circuit configured to detect touch information based on the capacitance between adjacent electrodes corresponding to an input of an external object to the sensor layer among the plurality of electrodes and detect pressure information at the position of a target electrode based on the difference in resistance between a reference electrode among the plurality of electrodes and the target electrode among the plurality of electrodes, the target electrode corresponding to the input. A resistance change characteristic corresponding to a change in temperature of the target electrode may be substantially the same as a resistance change characteristic corresponding to a change in temperature of the reference electrode. It is thus possible to eliminate the temperature variable that causes resistance change.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
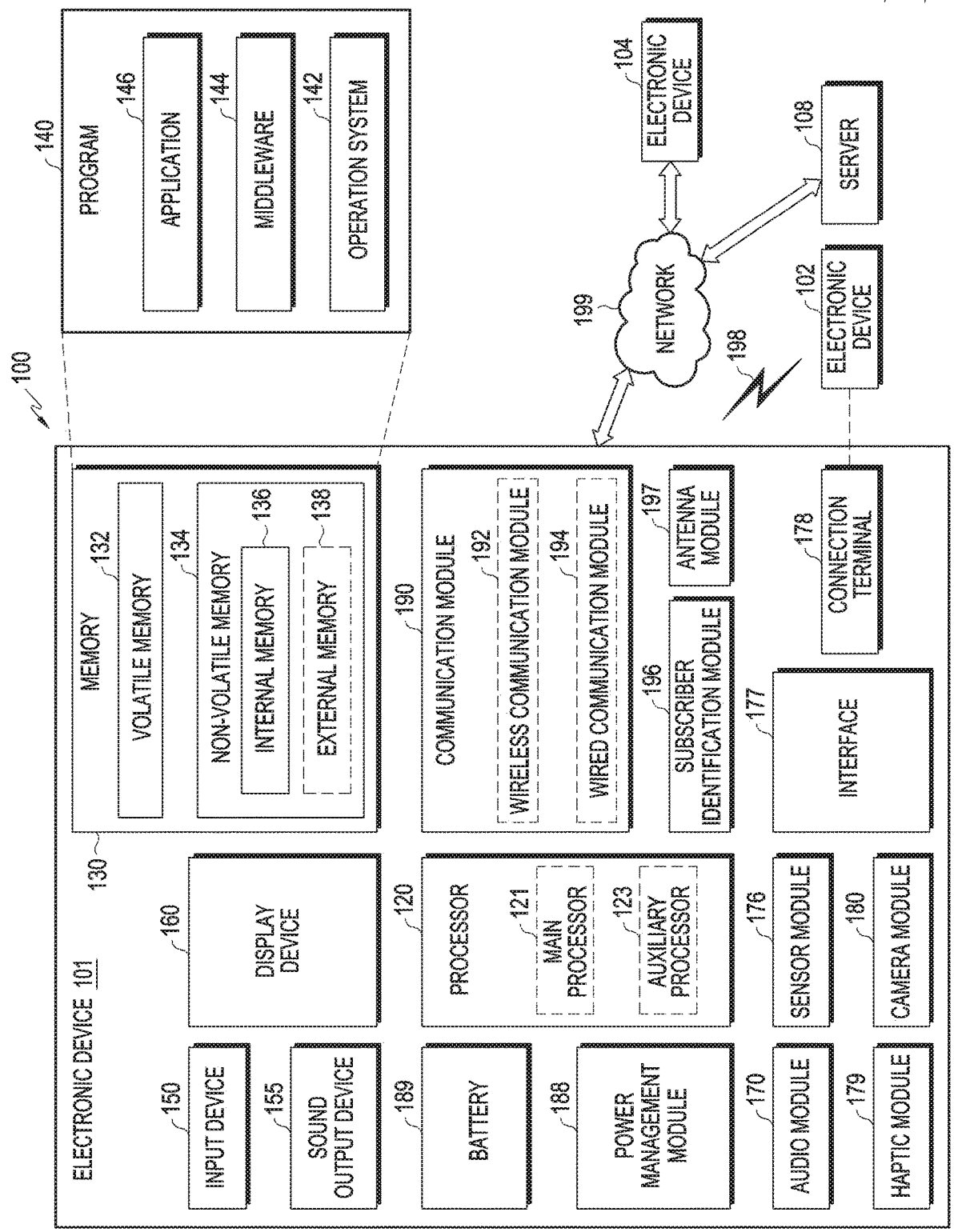
FIG. 1 is a block diagram illustrating an electronic device including a sensor layer for detecting touch and pressure and included in a network environment according to an embodiment of the disclosure.

FIG. 1 is a block diagram illustrating an electronic device including a sensor layer for detecting touch and pressure and included in a network environment according to an embodiment of the disclosure.

Referring to FIG. 1, an electronic device 101 in a network environment 100 may communicate with a first electronic device 102 via a first network 198 (e.g., a short-range wireless communication network), or a second electronic device 104 or a server 108 via a second network 199 (e.g., a long-range wireless communication network). According to an embodiment of the disclosure, the electronic device 101 may communicate with the second electronic device 104 via the server 108. According to an embodiment of the disclosure, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments of the disclosure, at least one (e.g., the display device 160 or the camera module 180) of the components may be omitted from the electronic device 101, or one or more other components may be added in the electronic device 101. In some embodiments of the disclosure, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment of the disclosure, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment of the disclosure, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least one of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment of the disclosure, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment of the disclosure, the audio module 170 may obtain the sound via the input device 150, or output the sound via the sound output device 155 or a headphone of an external electronic device (e.g., the first electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the first electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the first electronic device 102). According to an embodiment of the disclosure, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to an embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the first electronic device 102, the second electronic device 104, or the server 108) and performing communication via the established communication channel. The communication module 190 may include one or more communication processors that are operable independently from the processor 120 (e.g., the AP) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment of the disclosure, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least one of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external second electronic device 104 via the server 108 coupled with the second network 199. Each of the first and electronic device 102 and the second electronic device 104 may be a device of a same type as, or a different type, from the electronic device 101. According to an embodiment of the disclosure, all or some of operations to be executed at the electronic device 101 may be executed at one or more of the external first electronic device 102, second electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
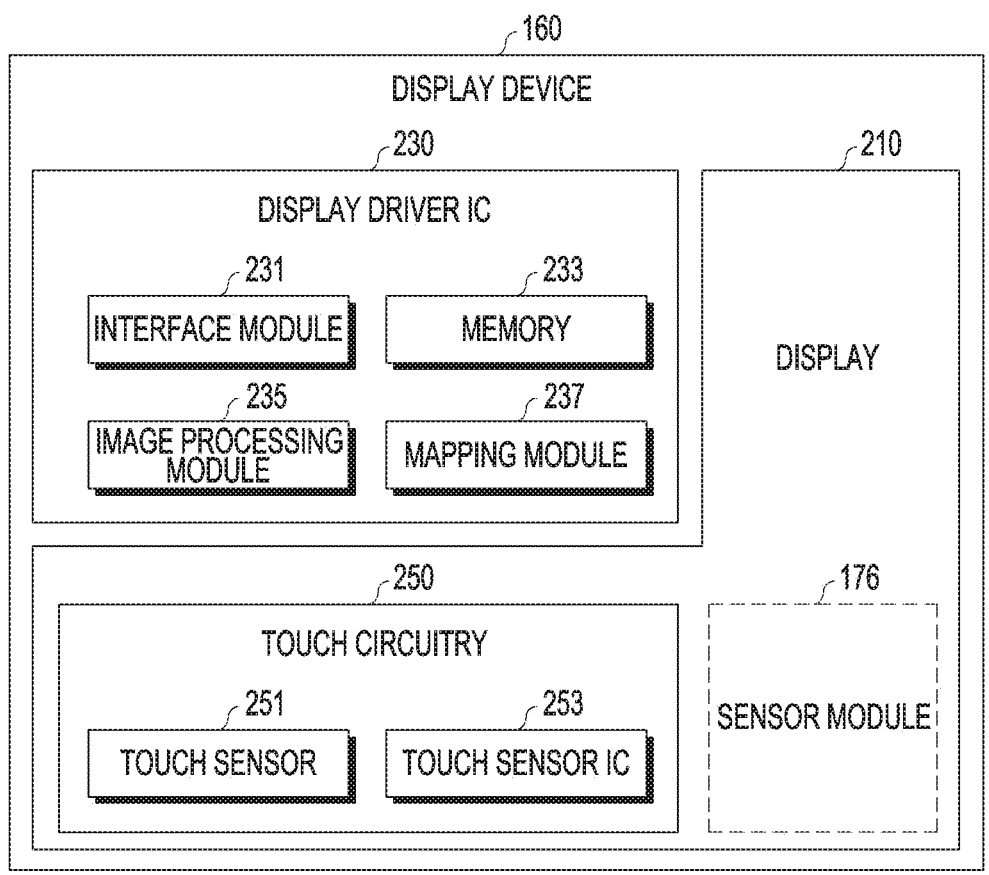
FIG. 2 is a block diagram illustrating a display device including a sensor layer for detecting touch and pressure according to an embodiment of the disclosure.

FIG. 2 is a block diagram illustrating a display device including a sensor layer for detecting touch and pressure according to an embodiment of the disclosure.

Referring to FIG. 2, the display device 160 may include a display 210 and a display driver integrated circuit (DDI) 230 to control the display 110. The DDI 230 may include an interface module 231, memory 233 (e.g., buffer memory), an image processing module 235, or a mapping module 237. The DDI 230 may receive image information that contains image data or an image control signal corresponding to a command to control the image data from another component of the electronic device 101 via the interface module 231. For example, according to an embodiment of the disclosure, the image information may be received from the processor 120 (e.g., the main processor 121 (e.g., an application processor)) or the auxiliary processor 123 (e.g., a graphics processing unit) operated independently from the function of the main processor 121. The DDI 230 may communicate, for example, with touch circuitry 250 or the sensor module 176 via the interface module 231. The DDI 230 may also store at least part of the received image information in the memory 233, for example, on a frame by frame basis. The image processing module 235 may perform pre-processing or post-processing (e.g., adjustment of resolution, brightness, or size) with respect to at least part of the image data. According to an embodiment of the disclosure, the pre-processing or post-processing may be performed, for example, based at least in part on one or more characteristics of the image data or one or more characteristics of the display 210. The mapping module 237 may generate a voltage value or a current value corresponding to the image data pre-processed or post-processed by the image processing module 135. According to an embodiment of the disclosure, the generation of the voltage value or current value may be performed, for example, based at least in part on one or more attributes of the pixels (e.g., an array, such as an RGB stripe or a pentile structure, of the pixels, or the size of each subpixel) of the display 210. At least one of pixels of the display 210 may be driven, for example, based at least in part on the voltage value or the current value such that visual information (e.g., a text, an image, or an icon) corresponding to the image data may be displayed via the display 210.

According to an embodiment of the disclosure, the display device 160 may further include touch circuitry 250. The touch circuitry 250 may include a touch sensor 251 and a touch sensor IC 253 to control the touch sensor 151. The touch sensor IC 253 may control the touch sensor 251 to sense a touch input or a hovering input with respect to a certain position on the display 210. To achieve this, for example, the touch sensor IC 253 may detect (e.g., measure) a change in a signal (e.g., a voltage, a quantity of light, a resistance, or a quantity of one or more electric charges) corresponding to a certain position on the display 210. The touch sensor IC 253 may provide input information (e.g., a position, an area, a pressure, or a time) indicative of the touch input or the hovering input detected to the processor 120. According to an embodiment of the disclosure, at least part (e.g., the touch sensor IC 253) of the touch circuitry 250 may be formed as part of the display 210 or the DDI 230, or as part of another component (e.g., the auxiliary processor 123) disposed outside the display device 160.

According to an embodiment of the disclosure, the display device 160 may further include at least one sensor (e.g., a fingerprint sensor, an iris sensor, a pressure sensor, or an illuminance sensor) of the sensor module 176 or a control circuit for the at least one sensor. In such a case, the at least one sensor or the control circuit for the at least one sensor may be embedded in one portion of a component (e.g., the display 210, the DDI 230, or the touch circuitry 250)) of the display device 160. For example, when the sensor module 176 embedded in the display device 160 includes a biometric sensor (e.g., a fingerprint sensor), the biometric sensor may obtain biometric information (e.g., a fingerprint image) corresponding to a touch input received via a portion of the display 210. As another example, when the sensor module 176 embedded in the display device 160 includes a pressure sensor, the pressure sensor may obtain pressure information corresponding to a touch input received via a partial or whole area of the display 210. According to an embodiment of the disclosure, the touch sensor 251 or the sensor module 176 may be disposed between pixels in a pixel layer of the display 210, or over or under the pixel layer.

Figure 3A:
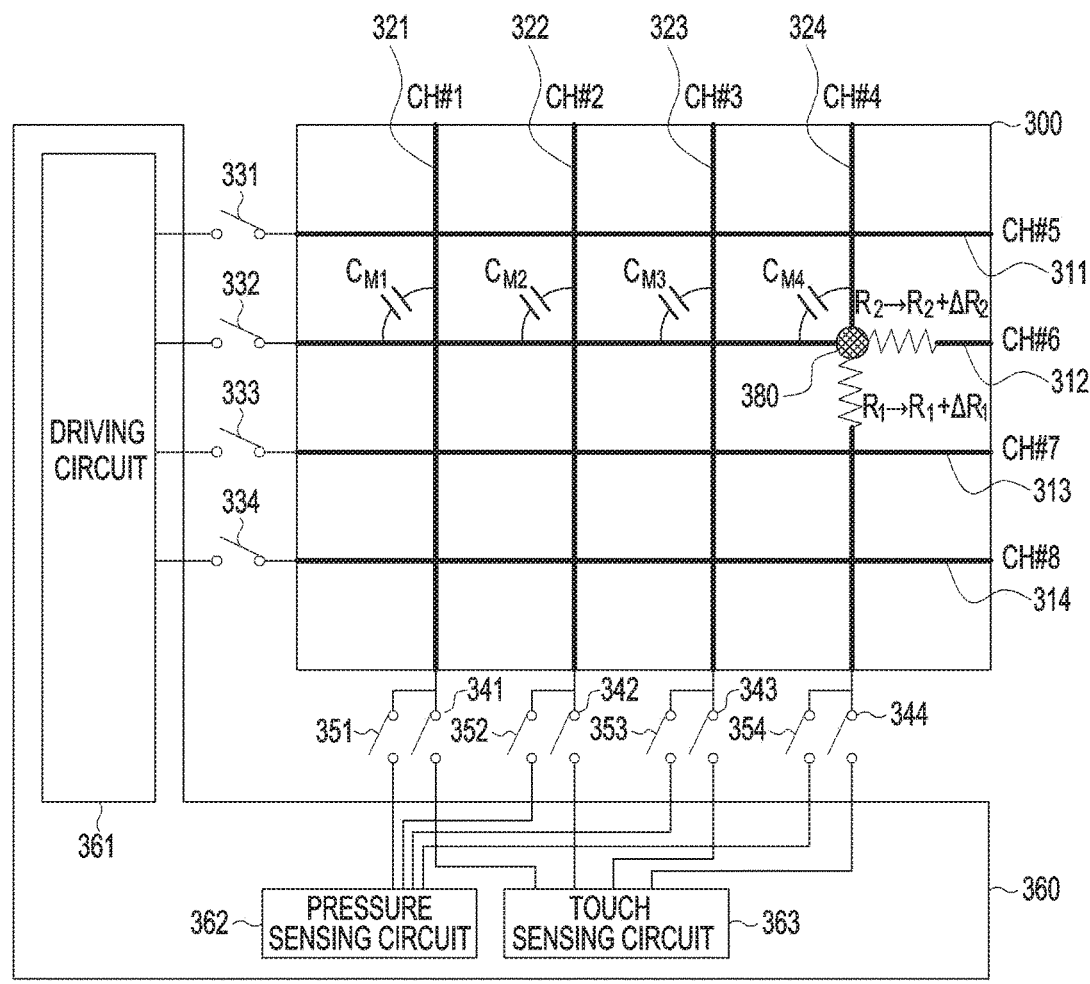
FIG. 3A is a view illustrating a sensor layer and a control circuit according to an embodiment of the disclosure.

FIG. 3A is a view illustrating a sensor layer and a control circuit according to an embodiment of the disclosure.

Referring to FIG. 3A, according to an embodiment of the disclosure, the electronic device 101 may include a sensor layer 300 (e.g., the touch sensor 251) and a control circuit 360 (e.g., the touch sensor IC 253). According to an embodiment of the disclosure, although the control circuit 360 may be implemented in the touch sensor IC 253, this is merely an example, and at least one of functions of the control circuit 360 may be performed by the processor 120 of the electronic device 101. The sensor layer 300 (e.g., the touch sensor 251) may include one or more first electrodes 321, 322, 323, and 324 and one or more second electrodes 311, 312, 313, and 314. The first electrodes 321, 322, 323, and 324 may extend in the vertical direction, and the second electrodes 311, 312, 313, and 314 may extend in the horizontal direction. Although the first electrodes 321, 322, 323, and 324 and the second electrodes 311, 312, 313, and 314 are shown in FIG. 3A to be implemented in rod shapes, they are not limited in shape thereto. For example, the electrodes may be implemented in a mesh, an example of which is described below in greater detail. Further, the number of electrodes is not limited.

According to an embodiment of the disclosure, the sensor layer 300 may be a single layer or a multi-layer structure. When the sensor layer 300 is a single layer, the first electrodes 321, 322, 323, and 324 and the second electrodes 311, 312, 313, and 314 may be arranged on a substrate. An insulating material may be provided between, and in the overlapping portion of at least one of the first electrodes 321, 322, 323, and 324 and at least one of the second electrodes 311, 312, 313, and 314. The first electrodes 321, 322, 323, and 324 or the second electrodes 311, 312, 313, and 314 may be connected via a bridge. When the sensor layer 300 is a multi-layer structure, the first electrodes 321, 322, 323, and 324 may be arranged on a first substrate, and the second electrodes 311, 312, 313, and 314 may be arranged on a second substrate. The first substrate and the second substrate may be stacked one over the other. The sensor layer 300 may be implemented separately from, or integrally with, the display panel. For example, the sensor layer 300 may be implemented as an on-cell touch (OCTA) active matrix organic light-emitting diode (AMOLED) layer, in which case the sensor layer 300 may directly be deposited on an AMOLED display. As another example, the sensor layer 300 may be implemented as a youm-on cell touch (Y-OCTA) AMOLED layer, in which case the sensor layer 300 may directly be deposited on a flexible AMOLED display. As another example, the sensor layer 300 may be deposited inside the display panel.

The first electrodes 321, 322, 323, and 324 may respectively correspond to channel1 CH #1, channel2 CH #2, channel3 CH #3, and channel4 CH #4. The second electrodes 311, 312, 313, and 314 may respectively correspond to channel5 CH #5, channel6 CH #6, channel7 CH #7, and channel8 CH #8. Channel1 CH #1, channel2 CH #2, channel3 CH #3, channel4 CH #4 may be termed 'first channels'. Channel5 CH #5, channel6 CH #6, channel7 CH #7, and channel8 CH #8 may be termed 'second channels'. Alternatively, it may be said that the first channels may include the first electrodes 321, 322, 323, and 324, and the second channels may include the second electrodes 311, 312, 313, and 314.

At least one of (e.g., the electrode 321) of the first electrodes 321, 322, 323, and 324 and at least one of (e.g., the electrode 312) of the second electrodes 311, 312, 313, and 314 may form mutual capacitance $C_{M1}$ therebetween. The electrode 322 and the electrode 312 may form mutual capacitance $C_{M2}$ therebetween, the electrode 322 and the electrode 313 may form mutual capacitance $C_{M3}$, and the electrode 322 and the electrode 314 may form mutual capacitance $C_{M4}$ therebetween. A driving circuit 361 may perform a control to output a driving signal to at least one TX electrode. For example, when the electrode 311 is determined as the TX electrode, the control circuit 360 may turn a switch 331 on to apply the driving signal to the electrode 311. For example, the control circuit 360 may turn the second 331 off and turn a switch 332 on, thereby allowing the driving signal to be applied to the electrode 312. The control circuit 360 may turn switches 331, 332, 333, and 334 on sequentially or simultaneously by a driving signal with orthogonality, thereby applying the driving signal to the electrodes 311, 312, 313, and 314. For example, while the driving signal is applied to the electrode 311, the control circuit 360 may simultaneously or sequentially turn the switches 341, 342, 343, and 344 on and may receive electrical signals from the first electrodes 321, 322, 323, and 324. The control circuit 360 may identify mutual capacitance between each of the first electrodes 321, 322, 323, and 324 and an adjacent electrode (e.g., the electrode 312) based on, at least, electrical signals from the first electrodes 321, 322, 323, and 324. The control circuit 360 may identify the position of the touch 380 according to a change in mutual capacitance. For example, the control circuit 360 may identify there is a change in magnitude between the mutual capacitance $C_{M4}$ identified while applying the driving signal to the electrode 312 and the mutual capacitance before the touch 380 was applied. A touch detecting circuit 363 in the control circuit 360 may identify the crossing of the electrode 312 and the electrode 324 as the position of the touch 380 based on the identified change. The touch detecting circuit 363 may process electrical signals output from the first electrodes 321, 322, 323, and 324 in a designated scheme, thereby identifying the position of the touch 380. Although FIG. 3A illustrates that the electronic device 101 identifies the position of the touch 380 based on mutual capacitance, this is merely an example, and it would readily be appreciated by one of ordinary skill in the art that the position of the touch 380 may be identified based on a change in the self capacitance of each electrode. Meanwhile, according to an embodiment of the disclosure, the switches 331, 332, 333, and 334 between the driving circuit 361 and the sensor layer 300 may be included in the electronic device 101, a driving signal may be directly transferred from the driving circuit 361 to the sensor layer 300.

When the identification and processing of capacitance to identify the position of the touch 380 are complete, the control circuit 360 may measure the magnitude of the pressure of the touch 380. The control circuit 360 may turn the switches 331, 332, 333, 334, 341, 342, 343, and 344 off to measure capacitance. The electronic device 101 may control the switches 351, 352, 353, and 354 to measure resistance, thereby identifying the magnitude of the pressure of the touch 380. For example, the control circuit 360 may turn the switch 354 on to be able to measure the resistance of the electrode (e.g., the electrode 324) corresponding to the position of the touch 380. The control circuit 360 may sequentially turn on the switches 351, 352, 353, and 354 to be able to sequentially measure the resistance of the first electrodes 321, 322, 323, and 324. Although not shown, the electronic device 101 may be configured to identify the magnitude of pressure only at a particular point (e.g., where the home button is displayed) of the touch sensor, in which case the switches corresponding to other electrodes not corresponding the particular point are not included in the electronic device 101 while only at least one electrode corresponding to the particular point may be connected to a pressure detecting circuit 362 through one switch. Although not shown, the second electrodes 311, 312, 313, and 314 may be connected to the pressure detecting circuit 362, in which case as the turn-on/off of the switch corresponding to the switches 351, 352, 353, and 354 is controlled, the resistance component in the horizontal direction and its corresponding pressure value may be measured.

The pressure detecting circuit 362 is not limited to a particular one so long as it is able to measure the resistance of the electrode connected thereto. According to an embodiment of the disclosure, while the pressure detecting circuit 362 measures pressure, the target electrode (e.g., the electrode 324) of the sensor layer 300 may be configured to have a double-routing structure in which both ends thereof are connected to the pressure detecting circuit 362. The pressure detecting circuit 362 may measure pressure based on the difference in resistance between two or more electrodes in order to compensate for a change in strain due to temperature, and this is described below in greater detail.

Figure 3B:
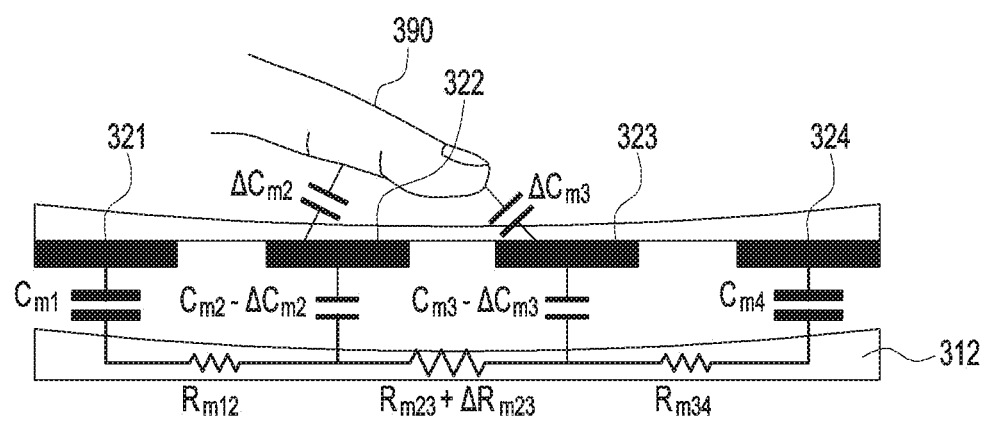
FIG. 3B is a cross-sectional view illustrating a sensor layer according to an embodiment of the disclosure.

FIG. 3B is a cross-sectional view illustrating a sensor layer according to an embodiment of the disclosure.

Referring to FIG. 3B, the mutual capacitance $C_{m1}$, the mutual capacitance C nm, the mutual capacitance $C_{m3}$, and the mutual capacitance $C_{m4}$ may be formed between the electrode 321 and another electrode 312, between the electrode 322 and the other electrode 312, between the electrode 323 and the other electrode 312, and between the electrode 324 and the other electrode 312. At this time, when the user's finger 390 touches near the electrode 322 and the electrode 323, the capacitance $\Delta C_{m2}$ may be formed between the user's finger 390 and the electrode 322, and the capacitance $\Delta C_{m3}$ may be formed between the user's finger 390 and the electrode 323. Thus, the capacitance between the electrode 322 and the other electrode 312 and the capacitance between the electrode 323 and the other electrode 312 may be changed to $C_{m2}-\Delta C_{m2}$ and $C_{m3}-\Delta C_{m3}$, respectively. The electronic device 101 (or the control circuit 360) may determine the position of the finger 390 based on the differences in capacitance (e.g., $\Delta C_{m2}$, $\Delta C_{m3}$). Meanwhile, when a touch is made to apply pressure, the resistance of the electrode 312 is changed. For example, when the original resistance of the electrode 312 is $Rm_{12}+R_{23}+R_{34}$ when there is no change in shape of the electrode, the resistance of the electrode 312 may be changed to $Rm_{12}+(R_{23}+\Delta R_{23})+R_{34}$ by a touch. Specifically, as the center portion of the electrode 312 is made thinner by the pressure of the finger 390, the length may be increased. Accordingly, the resistance near the center portion may be changed from $R_{23}$ to $R_{23}+\Delta R_{23}$, and the overall resistance may be changed to $Rm_{12}+(R_{23}+\Delta R_{23})+R_{34}$. Thus, the electronic device 101 (or the control circuit 360) may measure the magnitude of pressure based on the change in resistance.

According to an embodiment of the disclosure, the electronic device 101 may store information regarding the correlation between the change in resistance and the pressure and may identify the magnitude of pressure based on the stored information. According to an embodiment of the disclosure, the electronic device 101 may identify the magnitude of pressure based on the difference in resistance between a reference electrode (e.g., the electrode 314) and a target electrode (e.g., the electrode 312). For example, before a pressure is applied, no difference in resistance may be shown between the reference electrode (e.g., the electrode 314) and the target electrode (e.g., the electrode 312). When a pressure is applied to the target electrode (e.g., the electrode 312), the resistance of the target electrode (e.g., the electrode 312) is changed, whereas the resistance of the reference electrode (e.g., the electrode 314) is not changed, and thus, the difference in resistance may not be zero. The electronic device 101 may identify the magnitude of the pressure applied to the target electrode (e.g., the electrode 312) based on the difference in resistance that is not zero. The above-described process may block off the factor to change resistance by a temperature change. Because the reference electrode (e.g., the electrode 314) and the target electrode (e.g., the electrode 312) have the same resistance change characteristic over temperature, difference in resistance between the reference electrode and the target electrode may remain zero although the resistance of the reference electrode (e.g., the electrode 314) and target electrode (e.g., the electrode 312) are both changed according to change in temperature and not by pressure. By identifying pressure based on the difference in resistance between the reference electrode and the target electrode, factor for changing the resistance according to the temperature change cannot influence to identifying the pressure. The electronic device 101 may previously store information regarding the correlation between the magnitude of pressure and the magnitude of the parameter corresponding to the difference between the two resistances and may compare the identified parameter with the pre-stored information, thereby identifying the magnitude of pressure.

Referring back to FIG. 3A, the pressure detecting circuit 362 may identify that the resistance of the electrode 312 corresponding to channel6 CH #6 is changed from $R_2$ to $R_2+\Delta R_2$. The pressure detecting circuit 362 may identify that the resistance of the electrode 324 corresponding to channel4 CH #4 is changed from $R_1$ to $R_1+\Delta R_1$. The pressure detecting circuit 362 may identify the magnitude of pressure based on the change in resistance (at least one of $\Delta R_1$ or $\Delta R_2$). The pressure detecting circuit 362 may include an element, integrator, a sample-and-holder circuit, or an analog-to-digital converter (ADC), which is able to measure the resistance of the target electrode or the target electrode and reference electrode. According to an embodiment of the disclosure, the pressure detecting circuit 362 may share the integrator, sample-and-holder, and the ADC with the touch detecting circuit 363 or may also share other various peripheral circuits (e.g., low-dropout (LDO), bandgap reference, oscillator, memory, or multi-point control unit (MCU)) with them. Although the switches 331, 332, 333, 334, 341, 342, 343, 344, 351, 352, 353, and 354 are shown to be positioned outside the control circuit 360 for ease of description, at least one of the switches 331, 332, 333, 334, 341, 342, 343, 344, 351, 352, 353, and 354 may be configured inside the control circuit 360.

According to an embodiment of the disclosure, the switches 341, 342, 343, 344, 351, 352, 353, and 354 for selectively connecting the sensor layer 300 with the pressure detecting circuit 362 or the touch detecting circuit 363 might not be included in the electronic device 101. According to an embodiment of the disclosure, the pressure detecting circuit 362 and the touch detecting circuit 363 may be included in a single hardware device, in which case at least one of the electrodes 311, 312, 313, 314, 321, 322, 323, and 324 of the sensor layer 300 may be connected to the corresponding hardware device without passing through any switch. The hardware device may detect touch information based on electrical signals from at least one of the electrodes 311, 312, 313, 314, 321, 322, 323, and 324 of the sensor layer 300 during, e.g., a first period, according to time division, and may detect pressure information based on electrical signals from at least one of the electrodes 311, 312, 313, 314, 321, 322, 323, and 324 of the sensor layer 300 during a second period.

As set forth above, the electronic device 101 may identify the position of the touch 380 based on the capacitance between the electrodes of the sensor layer 300 during the first period and may identify the magnitude of pressure based on the difference in reference between two or more electrodes or resistance change in electrodes of the sensor layer 300 during the second period.

Figure 3C:
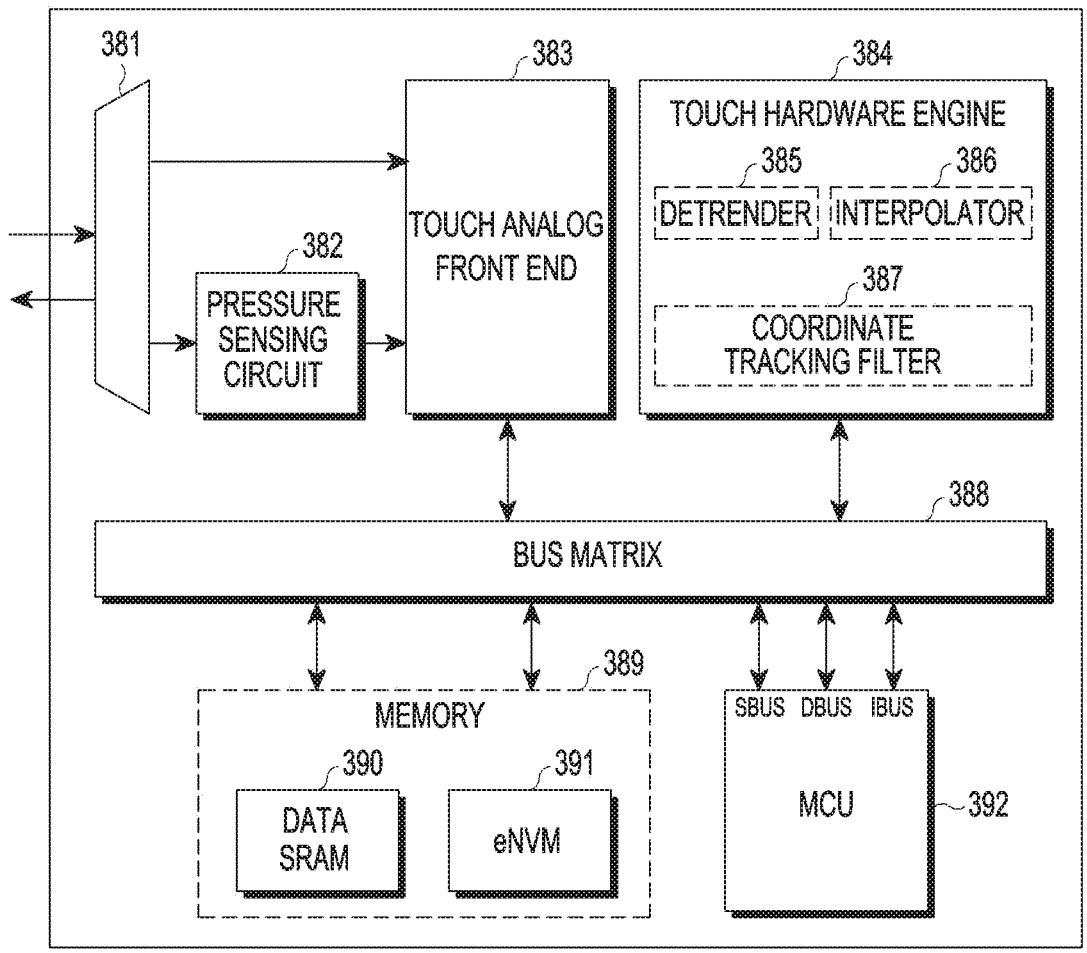
FIG. 3C is a view illustrating a system architecture according to an embodiment of the disclosure.

FIG. 3C is a view illustrating a system architecture according to an embodiment of the disclosure.

Referring to FIG. 3C, according to an embodiment of the disclosure, the control circuit 360 may include at least one of a demultiplexer 381, a pressure detecting circuit 382, a touch analog front end 383, a touch hardware engine 384, an advanced high-performance bus (AHB) bus matrix 388, a memory 389, or a MCU 392. The touch hardware engine 384 may include at least one of, e.g., a detrender 385, an interpolator 386, or a coordinate tracking filter 387.

The demultiplexer 381 may make a connection to at least one electrode of the sensor layer 300, receive signals for touch detecting or pressure detecting, or output driving signals (TSP driving signals). The pressure detecting circuit 382 may detect the magnitude of the pressure of the touch based on a signal from the target electrode received through the demultiplexer 381. For example, the pressure detecting circuit 382 may include at least one of a DAC or a transistor for supplying current inversely proportional to resistance, which is described below in greater detail. The pressure detecting circuit 382 may be configured to receive signals from the target electrode or from the target electrode and the reference electrode and to output a signal indicating the magnitude of pressure. The signal indicating the magnitude of pressure may be input to the touch analog front end 383. The touch analog front end 383 may process the signal received from the pressure detecting circuit 382, convert the signal into a digital value, and output the digital value. The touch analog front end 383 may include, e.g., a capacitor, a switch, a resistor, an amplifier, a sampling-and-holder, or an ADC. The touch analog front end 383 may receive signals from at least one electrode of the sensor layer 300 through the demultiplexer 381, process the signals, and convert the signals into digital values. The processed signals may be delivered through the AHB bus matrix 388 to the touch hardware engine 384. The touch hardware engine 384 may include a digital logic to drive the touch analog front end 383. The detrender 385 of the touch hardware engine 384 may extract a linear trend from, e.g., time-series data. The interpolator 386 may accurately determine the position of the touch by performing interpolation based on sampled data. The coordinate tracking filter 387 may be a tracking filter to enhance the signal-noise ratio (SNR) of signals from the sensor layer 300. The MCU 392 may control the overall operation of the control circuit 360 and may identify at least one of the magnitude of pressure or the position of the touch. According to an embodiment of the disclosure, at least one of the magnitude of pressure or the position of a touch may be identified by at least one of the touch hardware engine 384 or the MCU 392. The memory 389 may include at least one of, e.g., a data static random-access memory (SRAM) 390 or an embedded non-volatile memory (eVNM) 391. The memory 389 may store at least one of a code or parameter for control. In other words, according to an embodiment of the disclosure, the control circuit 360 may be implemented to add the pressure detecting circuit 382 to a conventional control circuit for touch detecting.

Meanwhile, although such an example is described above in which the pressure detecting circuit 382 is operated together with the touch analog front end 383 for touch detecting, this is merely an example, and the pressure detecting circuit 382 may alternatively be implemented to be independent from the touch analog front end 383. For example, the pressure detecting circuit 382 may be implemented as any strain gauge capable of measuring pressure, and the strain gauge is not limited in type.

Figure 4A:
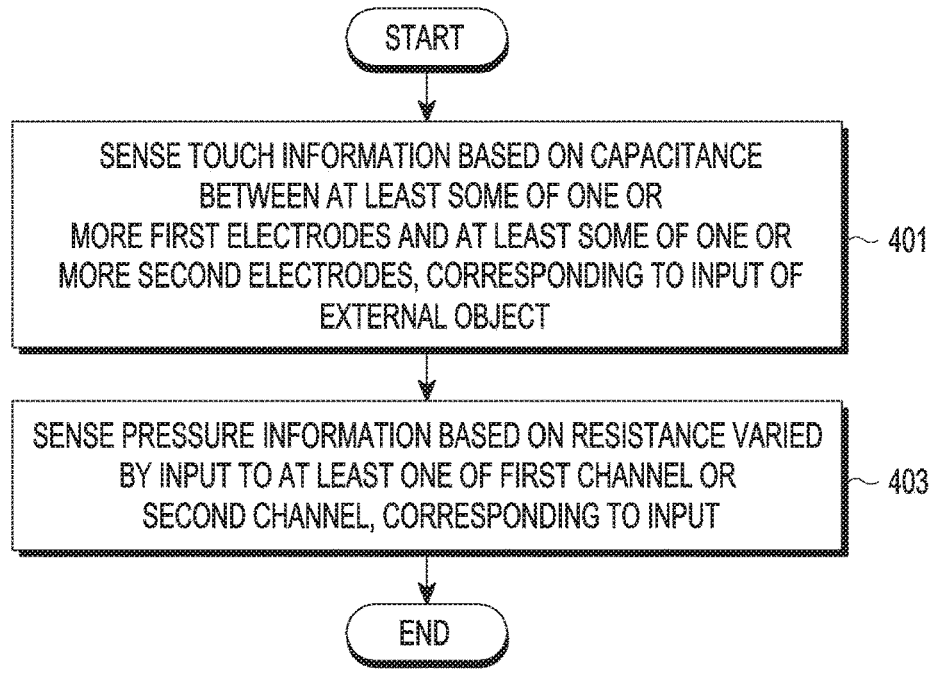
FIG. 4A is a flowchart illustrating a method for operating an electronic device according to an embodiment of the disclosure.

FIG. 4A is a flowchart illustrating a method for operating an electronic device according to an embodiment of the disclosure.

Referring to FIG. 4A, according to an embodiment of the disclosure, the electronic device 101 (e.g., the control circuit 360), in operation 401, may detect touch information based on the capacitance between at least one of one or more first electrodes (e.g., the first electrodes 321, 322, 323, and 324 of FIGS. 3A and 3B) and at least one of one or more second electrodes (e.g., the second electrodes 311, 312, 313, and 314 of FIG. 3A) corresponding to an input of an external object. For example, the electronic device 101 may detect the position of a touch based on a change in capacitance between at least one of first electrodes and at least one of second electrodes.

In operation 403, the electronic device 101 (e.g., the control circuit 360) may detect pressure information based on the resistance changed by the input to at least one of the first channels (e.g., the channel1 CH #1, the channel2 CH #2, the channel3 CH #3, and the channel4 CH #4 of FIG. 3A) and the second channels (e.g., the channel5 CH #5, the channel6 CH #6, the channel7 CH #7, and the channel8 CH #8), corresponding to the input. According to an embodiment of the disclosure, the electronic device 101 may sequentially or simultaneously measure resistances for at least one pre-designated channel and detect the pressure information. For example, the electronic device 101 may include a full-front touchscreen without any physical or soft key on the bezel. In this case, the electronic device 101 may display a home button on the full-front touchscreen and may measure the resistance of the electrode corresponding to the position of the home button. To block off changes due to temperature, the electronic device 101 may measure the magnitude of pressure based on differences in resistance between two or more electrodes (e.g., the target electrode and reference electrode). The channel for measuring the resistance may be designated by pre-designated information or may be set based on at least one of the position of the electronic device or the touch information.

Figure 4B:
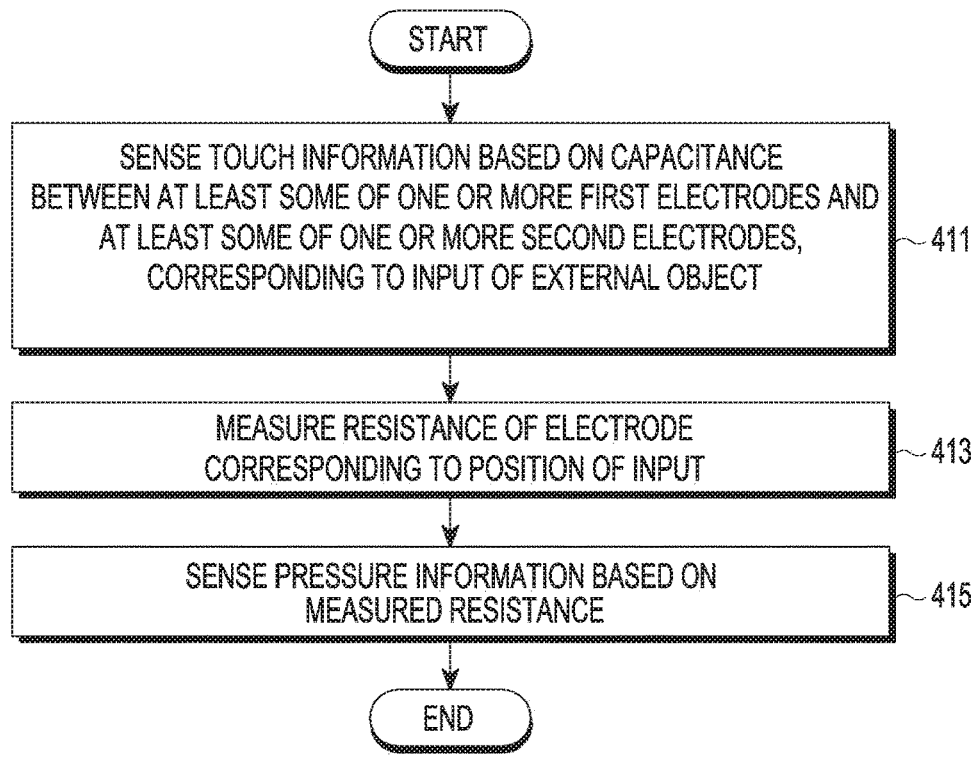
FIG. 4B is a flowchart illustrating a method for operating an electronic device according to an embodiment of the disclosure.

FIG. 4B is a flowchart illustrating a method for operating an electronic device according to an embodiment of the disclosure.

Referring to FIG. 4B, according to an embodiment of the disclosure, the electronic device 101 (e.g., the control circuit 360), in operation 411, may detect the position of an input of an external object, based on the capacitance between at least one of one or more first electrodes (e.g., the first electrodes 321, 322, 323, and 324 of FIGS. 3A and 3B) and at least one of one or more second electrodes (e.g., the second electrodes 311, 312, 313, and 314 of FIG. 3A) corresponding to the input of the external object.

In operation 413, the electronic device 101 may measure the resistance of the electrode corresponding to the position of the input. In operation 415, the electronic device 101 may detect pressure information based on the measured resistance. For example, upon determining that the touch 380 has been made in the position corresponding to the electrode 312 and electrode 324 of FIG. 3A, the electronic device 101 may detect pressure information based on a change in the resistance of at least one of the electrode 312 or the electrode 324. The electronic device 101 may determine at least one of the electrode 312 or the electrode 324 as the target electrode and may detect pressure information based on the difference in resistance between the target electrode and the reference electrode.

Figure 5A:
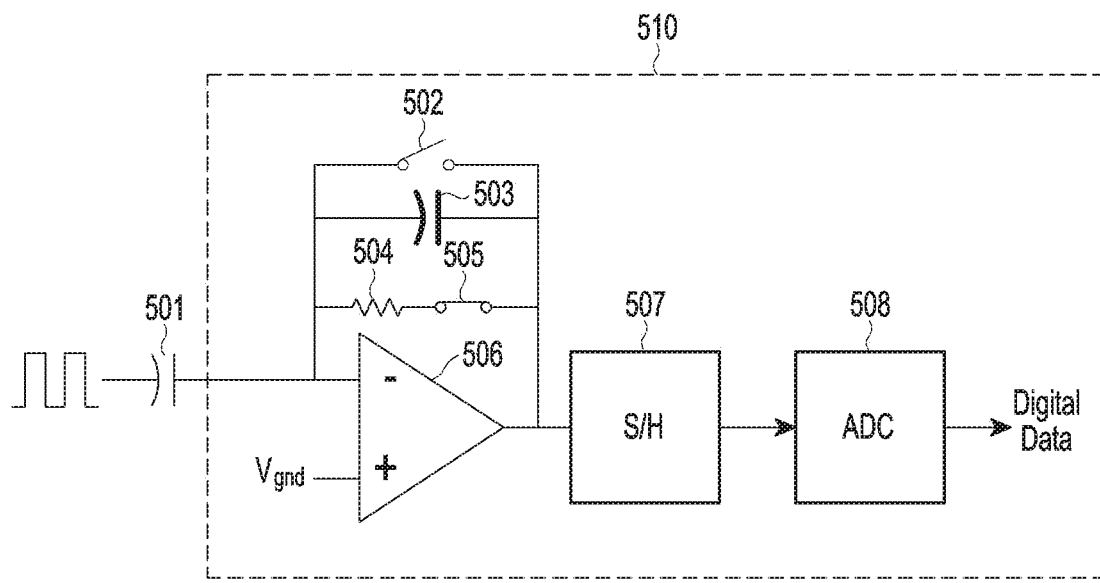
FIGS. 5A and 5B are views illustrating a touch analog front end according to various embodiments of the disclosure.
Figure 5B:
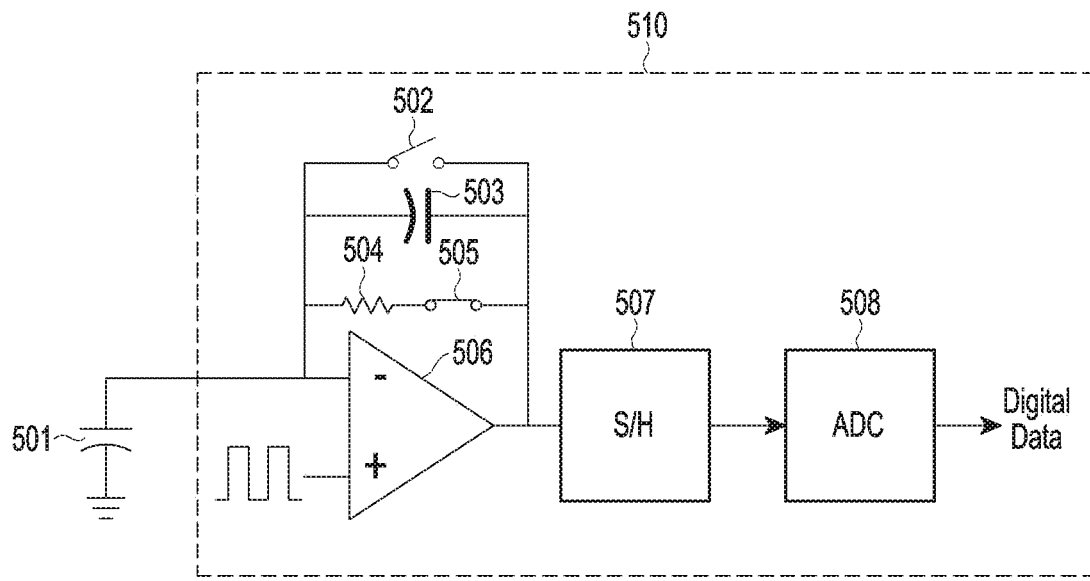

FIGS. 5A and 5B are views illustrating a touch analog front end according to various embodiments of the disclosure.

FIG. 5A may illustrate an example in which the system of FIGS. 3A-3C is used for mutual detecting purposes, and FIG. 5B may illustrate an example in which the system of FIGS. 3A-3C is used for self-touch detecting purposes.

Referring to FIG. 5A, a touch analog front end 510 (e.g., the touch analog front end 383) may include at least one of a switch 502, a capacitor 503, a resistor 504, a switch 505, an amplifier 506, a sample-and-holder circuit 507, or an ADC 508. While measuring the position of a touch, the amplifier 506 may receive a signal from at least one electrode and convert the signal into a voltage and output the voltage. The switch 502 may be used for resetting. The switch 505 may be turned on during the period of measuring touch. Accordingly, the resistor 504 on the feedback side may be connected via the switch 505, so that the amplifier 506 may be used as a charge amplifier. A signal from the electrode may be input to the negative (−) terminal of the amplifier 506 via, e.g., the capacitor 501, and a voltage of $V_{gnd}$ may be applied to the positive (+) terminal of the amplifier 506. The voltage corresponding to the electric charge in the capacitor 503 may be sampled by the sample-and-holder circuit 507 and may then put on hold for a predetermined time. The ADC 508 may convert the sampled signal into digital data and output the digital data.

Referring to FIG. 5B, contrary to FIG. 5A, a signal may be input to the positive (+) terminal of the amplifier 526, and the negative (−) terminal of the amplifier 526 may be connected to a terminal of the capacitor 501. The other terminal of the capacitor 501 may be grounded.

Figure 6A:
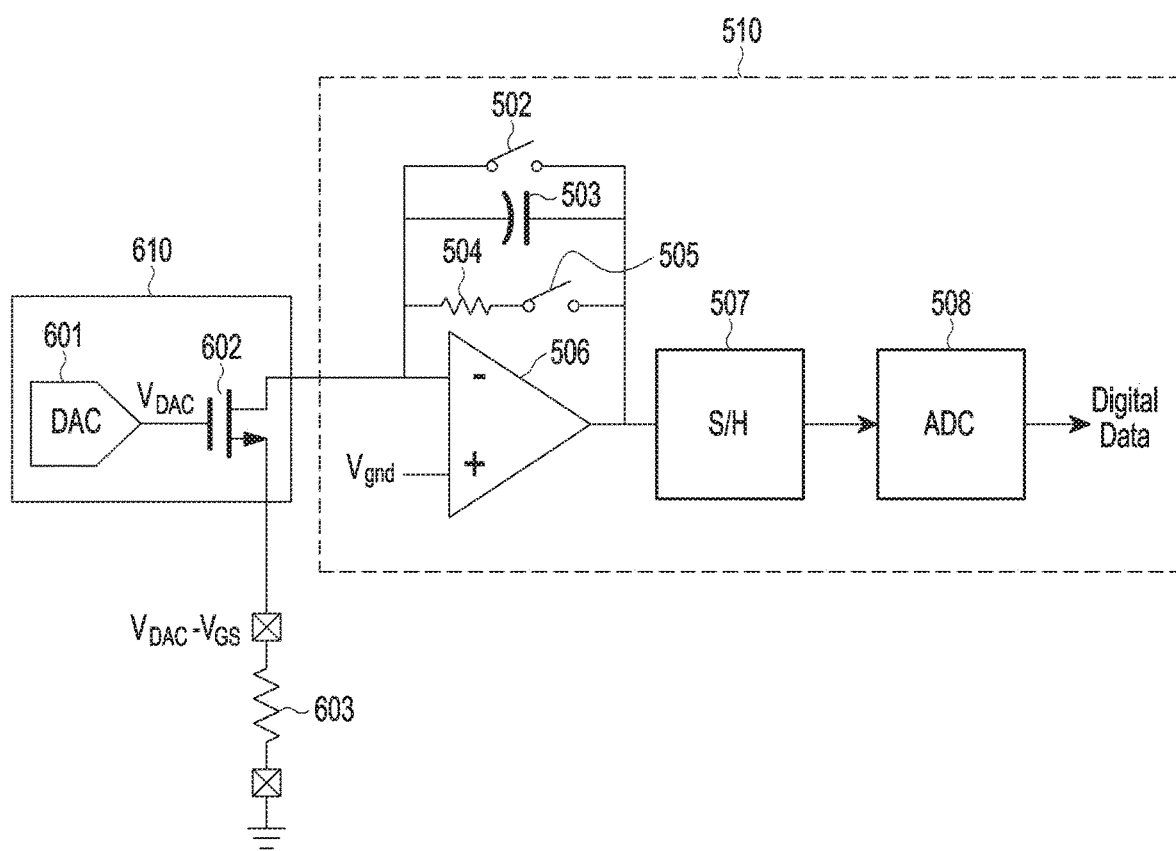
FIG. 6A is a view illustrating a circuit for detecting pressure according to an embodiment of the disclosure.

FIG. 6A is a view illustrating a circuit for detecting pressure according to an embodiment of the disclosure.

Referring to FIG. 6A, according to an embodiment of the disclosure, a pressure detecting circuit 610 (e.g., the pressure detecting circuit 382) may include a DAC 601 and a field effect transistor (FET) 602. The output terminal of the DAC 601 may be connected to the gate of the FET 602, and a voltage of $V_{DAC}$ may be applied to the gate. The source of the FET 602 may be connected to a terminal of a target electrode 603 for resistance measurement. The other terminal of the target electrode 603 may be grounded. For example, a switch may be provided to selectively connect the other terminal of the target electrode 603 with the pressure detecting circuit 610 (or the control circuit 360). The switch may be turned off during the period of measuring the position of a touch and may be turned on during the period of measuring the magnitude of pressure. As such, as one terminal of the target electrode 603 is connected to the source of the FET 602 of the pressure detecting circuit 610, and the other terminal of the target electrode 603 is grounded, the target electrode 603 may be prevented from floating. A voltage of $V_{DAC}$-$V_{GS}$ may be applied to one terminal of the target electrode 603, and a current proportional thereto may be rendered to flow to the negative (−) terminal of the amplifier 506. A voltage of $V_{gnd}$ may be applied to the positive (+) terminal of the amplifier 506. The amplifier 506 may be used as an integrator, and to that end, the switch 505 may be turned off to prevent a feedback resistor 504 from connecting. The sample-and-holder circuit 507 may sample the signal from the output terminal of the amplifier 506, put the signal on hold for a predetermined time, and then output the signal to the ADC 508. The ADC 508 may convert the received signal into digital data and output the digital data. The digital data may be proportional to the magnitude of the voltage $V_{DAC}$-$V_G$s and may correspond to the magnitude of current inversely proportional to the resistance $R_m$ of the target electrode 603. The control circuit 360 may identify the magnitude of pressure applied to the target electrode 603. The switch 502 may be used for resetting.

Figure 6B:
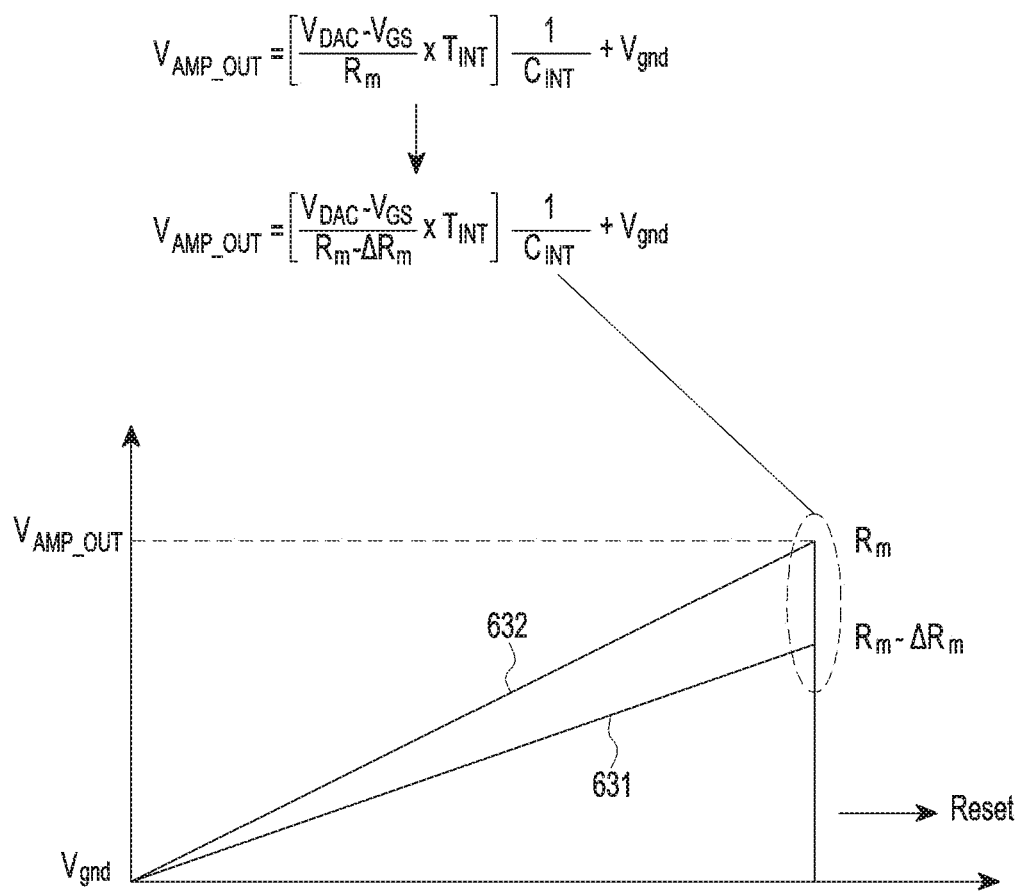
FIG. 6B is a view illustrating an output waveform from an amplifier according to an embodiment of the disclosure.

FIG. 6B is a view illustrating an output waveform from an amplifier according to an embodiment of the disclosure.

Referring to FIG. 6B, the voltage $V_{AMP\_OUT}$ at the output terminal of the amplifier 506 of FIG. 6A may be $$\left[\frac{V_{DAC} - V_{GS}}{R_m} \times T_{INT}\right] \times \frac{1}{C_{INT}} + V_{gnd}.$$

Here, $R_m$ may be the resistance of the target electrode 603 for resistance measurement, $T_{INT}$ may be the integration period, and $C_{INT}$ may be the capacitance of the capacitor 503 for integration. For example, the second graph 632 may represent the voltage $V_{AMP\_OUT}$ at the output terminal of the amplifier 506 when the resistance $R_m$ is maintained as no pressure is applied to the target electrode 603. When the resistance of the target electrode 603 is changed to $R_m + \Delta R_m$ by pressure, the voltage $V_{AMP\_OUT}$ at the output terminal of the amplifier 506 may also be changed to $$\left[\frac{V_{DAC} - V_{GS}}{R_m + \Delta Rm} \times T_{INT}\right] \times \frac{1}{C_{INT}} + V_{gnd}.$$

The first graph 631 may represent the voltage $V_{AMP\_OUT}$ at the output terminal of the amplifier 506 when the resistance $R_m$ is changed from $R_1$ to $R_m + \Delta R_m$. The control circuit 360 may identify the resistance based on the voltage $V_{AMP\_OUT}$ at the output terminal of the amplifier 506 and hence the magnitude of pressure.

Figure 7A:
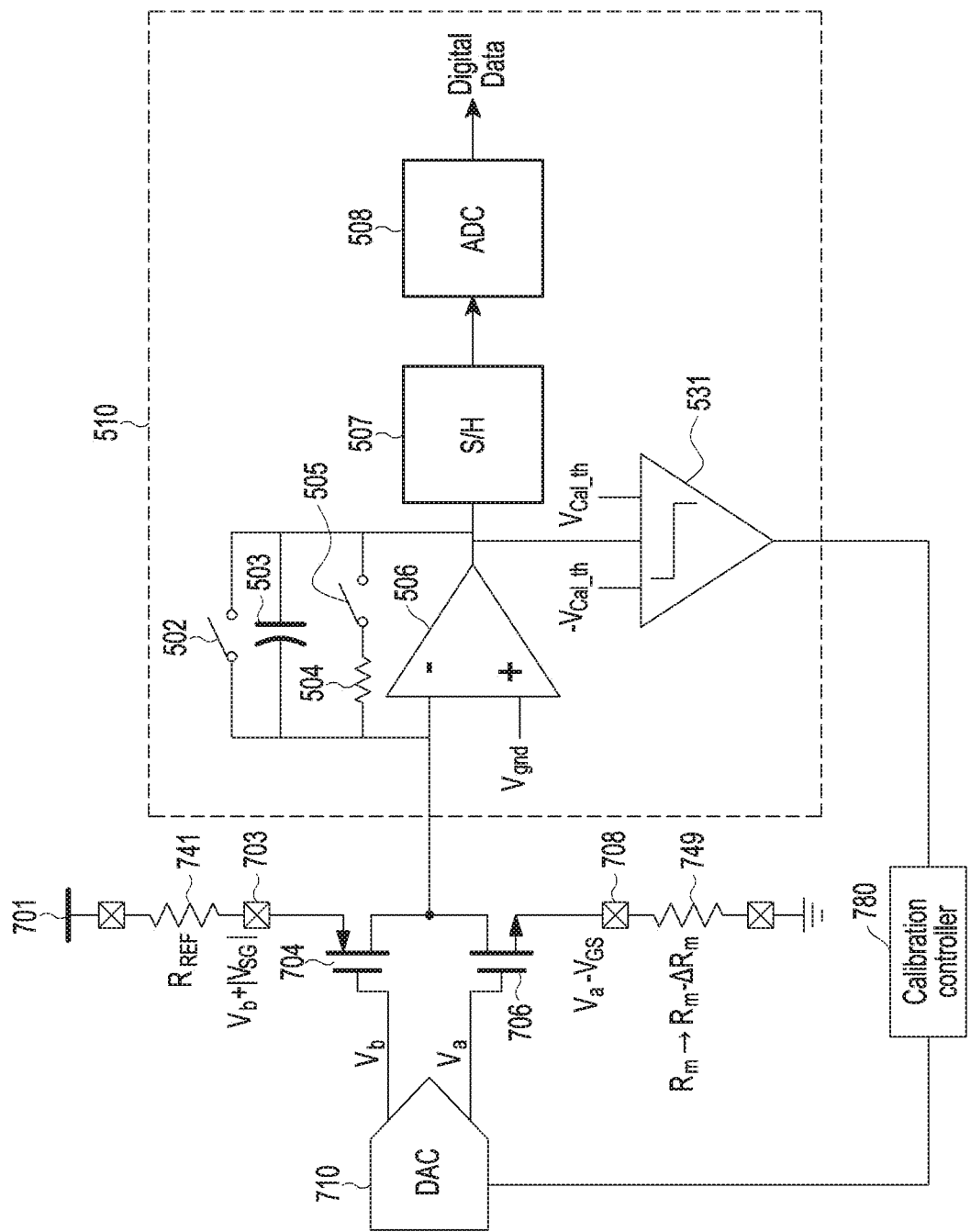
FIG. 7A is a circuit diagram illustrating a pressure detecting circuit for compensating for temperature according to an embodiment of the disclosure.
Figure 7B:
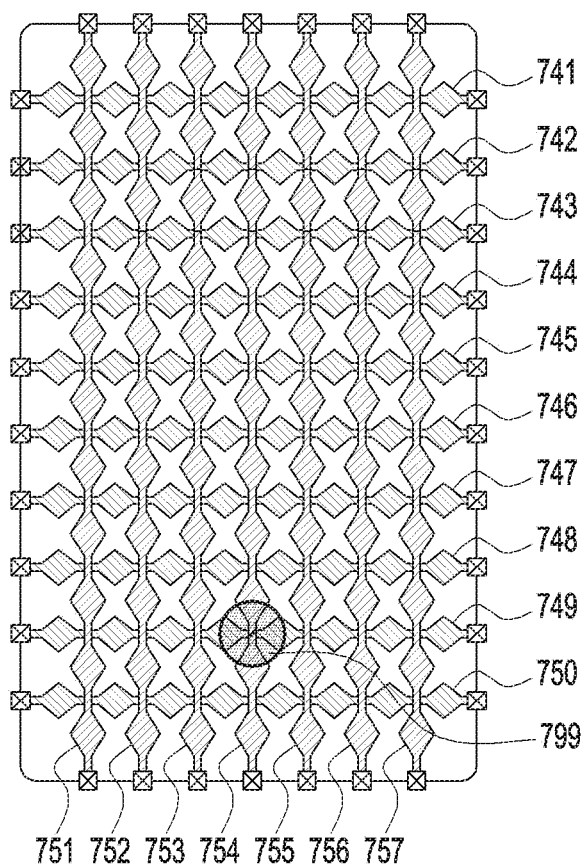
FIG. 7B is a view illustrating an electrode according to an embodiment of the disclosure.

FIG. 7A is a circuit diagram illustrating a pressure detecting circuit for compensating for temperature according to an embodiment of the disclosure. FIG. 7B is a view illustrating an electrode according to an embodiment of the disclosure.

According to an embodiment of the disclosure, the control circuit 360 of FIG. 7A may compensate for errors due to temperature changes by identifying the magnitude of pressure based on the difference in resistance between two electrodes.

Referring to FIGS. 7A and 7B, according to various embodiments of the disclosure, the electronic device 101 may include a plurality of electrodes 741, 742, 743, 744, 745, 746, 747, 748, 749, 750, 751, 752, 753, 754, 755, 756, and 757 arranged on a sensor layer. Among a plurality of electrodes 741, 742, 743, 744, 745, 746, 747, 748, 749, and 750, the electrode 749 covering the area 799 where a home button is displayed may be preset as the target electrode. Further, the uppermost electrode 741 may be preset as a reference electrode. A terminal of the reference electrode 741 may be connected to a voltage application terminal 701 during the period of measuring period, and accordingly, a reference voltage $V_{DD}$ may be applied to the terminal of the reference electrode 741. According to an embodiment of the disclosure, the reference electrode 741 may be grounded, and the target electrode 749 may be connected to the voltage application terminal 701. The pressure detecting circuit may include a voltage source capable of producing the reference voltage $V_{DD}$, e.g., a voltage source for detecting the position of a touch, and may further include a separate voltage source. During the period of measuring the position of the touch, the reference electrode 741 is operated as an RX electrode, and may thus be not connected to the voltage application terminal 701. Although not shown, a switch may be connected between the reference electrode 741 and the voltage application terminal 701.

The resistance of the reference electrode 741 may be $R_{REF}$. The other terminal of the electrode 741 may be connected to a node 703 which may be connected to the source of the FET 704. The voltage at the node 703 may be $V_b + |V_{SG}|$. $V_b$ may be a voltage applied to a first output line of the DAC 710, and $V_a$ may be a voltage applied to a second output line of the DAC 710. Thus, the current $I_{ref}$ $(V_{DD} - (V_b + |V_{SG}|))/R_{ref}$ may flow to the reference electrode 741.

According to an embodiment of the disclosure, the reference electrode 741 may be set to be the electrode farthest away from the target electrode for measurement. For example, when the area where the home button is displayed is positioned at the bottom of the display, the electronic device 101 may set the uppermost electrode of the sensor layer as the reference electrode, and when a menu for detecting pressure is positioned at the top of the display, the electronic device 101 may set the lowermost electrode of the sensor layer as the reference electrode.

According to an embodiment of the disclosure, the reference electrode may be positioned adjacent to the target electrode, and the reference electrode may be situated in various positions on the same electrode.

The voltage $V_b$ may be applied to the gate of the FET 706. The node 708 may be connected with one terminal of the target electrode 749 and the source of the FET 706. Thus, the voltage $V_a - V_{GS}$ may be applied to the node 708. The other terminal of the target electrode 749 may be grounded, and thus, $I_R = (V_a - V_{GS})/R_m$ may flow from the node 708 through the target electrode 749 to the ground. $R_m$ may mean the resistance of the target electrode 749. $R_m$ may be changed to $R_m + \Delta R_m$ by pressure.

The current I output from the node 700 may be $I_{ref} - I_R = (V_{DD} - (V_b + |V_{SG}|))/R_{ref} - (V_a - V_{GS})/R_m$. According to an embodiment of the disclosure, when no pressure is applied, the electronic device 101 may adjust the voltage ($V_a$, $V_b$) output from the DAC 710 to maintain the current I output from the node 700 as zero, and this process may be termed 'calibration'. When, after calibration, the resistance of the target electrode 749 is changed to $R_m + \Delta R_m$ by the occurrence of pressure, the current I output from the node 700 may be $I_{ref} - I_R = (V_{DD} - (V_b + |V_{SG}|))/R_{ref} - (V_a - V_{GS})/(R_m + \Delta R_m)$. In turn, a non-zero voltage may be applied to the output voltage $V_{AMP\_OUT}$ of the amplifier 506. The sampling-and-hold circuit 507 may sample and put on hold the output signal and then output to the ADC 508, and the ADC 508 may convert the sampled signal into digital data and output the digital data. The control circuit 360 may identify the magnitude of pressure based on the digital data.

Although a resistance change is caused by temperature, the reference electrode 741 and the target electrode 749 both experience such a resistance change. Thus, the current I output from the node 700 may remain zero. In other words, the current I output from the node 700 may be not zero, when resistance of only one electrode is changed due to the pressure on the only one electrode. Even without application of pressure, the reference electrode 741 and the target electrode 749 may be changed in resistance by other factors. In this case, the current I output from the node 700 might not be zero. The electronic device 101 may keep the current I output from the node 700 zero while there is no pressure by adjusting the output voltage (at least one of $V_a$ or $V_b$) of the DAC 710. Here, 'current remains zero' may be appreciated as the current being so tiny that it may be taken as zero.

Specifically, a comparator 531 may be connected to the output terminal of the amplifier 506. The comparator 531 may make the comparison as to whether the output voltage of the amplifier 506 is not less than a negative threshold $-V_{cal\_th}$ and not more than a positive threshold $V_{cal\_th}$, and deliver the result of the comparison to a calibration controller 780. When the comparison results in the output voltage of the amplifier 506 is within the range from the negative threshold $-V_{cal\_th}$ to the positive threshold $V_{cal\_th}$, the calibration controller 780 may abstain from performing calibration. When the comparison results in the output voltage of the amplifier 506 being out of the range from the negative threshold $-V_{cal\_th}$ to the positive threshold $V_{cal\_th}$, the calibration controller 780 may perform calibration. For example, the calibration controller 780 may adjust the output voltage (at least one of $V_a$ or $V_b$) of the DAC 710 to allow the output voltage of the amplifier 506 to be within the range from the negative threshold $-V_{cal\_th}$ to the positive threshold $V_{cal\_th}$.

Figure 7C:
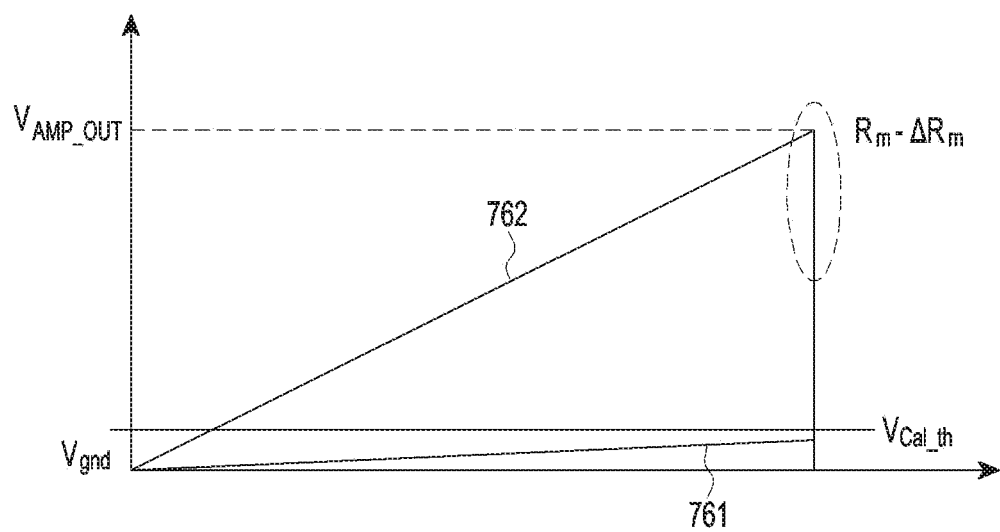
FIG. 7C is a graph for output voltage of an amplifier according to an embodiment of the disclosure.

FIG. 7C is a graph for output voltage of an amplifier according to an embodiment of the disclosure.

Referring to FIG. 7C, accordingly, when pressure is not applied, the voltage at the output terminal of the amplifier may be not more than the positive threshold $V_{cal\_th}$ as shown in FIG. 7C. Meanwhile, when a pressure is applied, the resistance of the target electrode 749 may be changed to $R_m + \Delta R_m$, resulting in the voltage 762 at the output terminal of the amplifier exceeding the positive threshold $V_{cal\_th}$. The control circuit 360 may identify the magnitude of pressure based on the voltage 762 at the output terminal of the amplifier. The control unit 360 may ignore the magnitude of pressure based on the voltage 761 which is under the positive threshold $V_{cal\_th}$.

Figure 8:
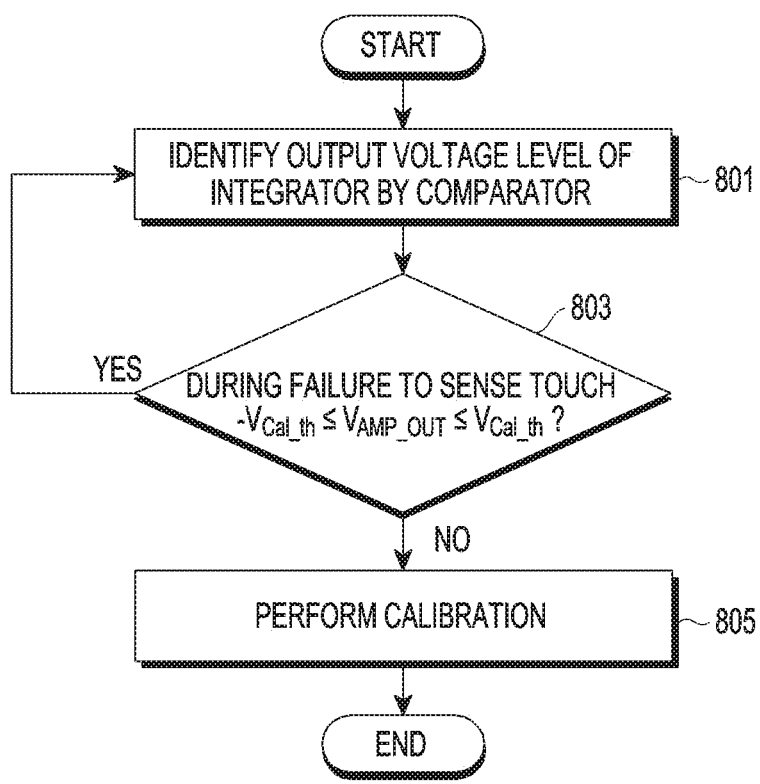
FIG. 8 is a flowchart illustrating a method for operating an electronic device according to an embodiment of the disclosure.

FIG. 8 is a flowchart illustrating a method for operating an electronic device according to an embodiment of the disclosure.

Referring to FIG. 8, according to an embodiment of the disclosure, the electronic device 101 (e.g., the control circuit 360), in operation 801, may identify the output voltage level of the amplifier 506 through the comparator 531. In operation 803, the electronic device 101 may determine whether the output voltage $V_{AMP\_OUT}$ of the amplifier 506 falls with a designated range (e.g., the range from the negative threshold $-V_{cal\_th}$ to the positive threshold $V_{cal\_th}$) during a failure to detect touch, i.e., when the touch is not measured. Unless the output voltage $V_{AMP\_OUT}$ of the amplifier 506 is within the designated range (e.g., the range from the negative threshold $-V_{cal\_th}$ to the positive threshold $V_{cal\_th}$), the electronic device 101 may perform calibration in operation 805. More specifically, the calibration controller 101 may adjust the output voltage (at least one of $V_a$ or $V_b$) of the DAC 710 to allow the output voltage of the amplifier 506 to be within the range from the negative threshold $-V_{cal\_th}$ to the positive threshold $V_{cal\_th}$.

Figure 9A:
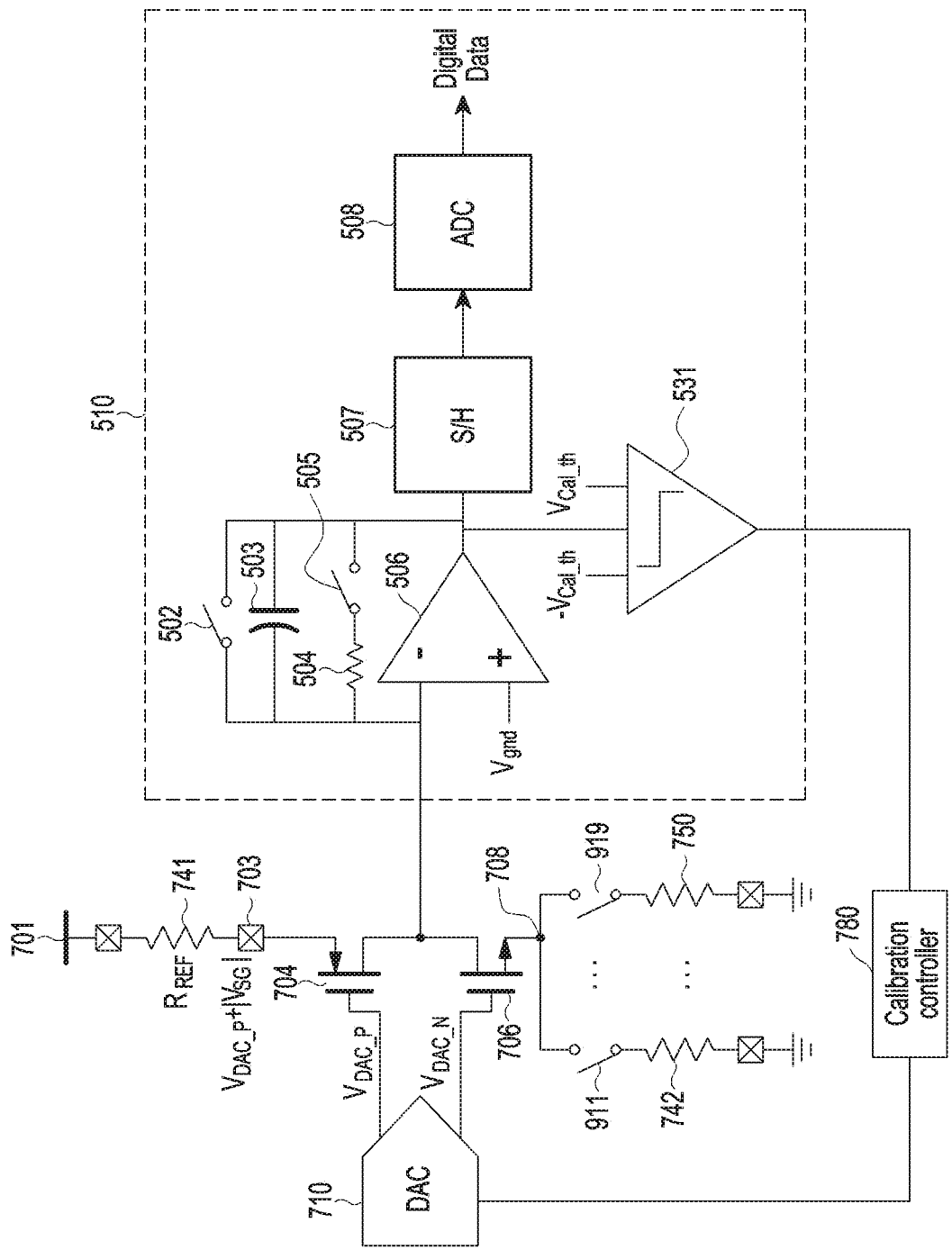
FIG. 9A is a view illustrating a circuit for detecting pressure according to an embodiment of the disclosure.

FIG. 9A is a view illustrating a circuit for detecting pressure according to an embodiment of the disclosure.

Figure 9B:
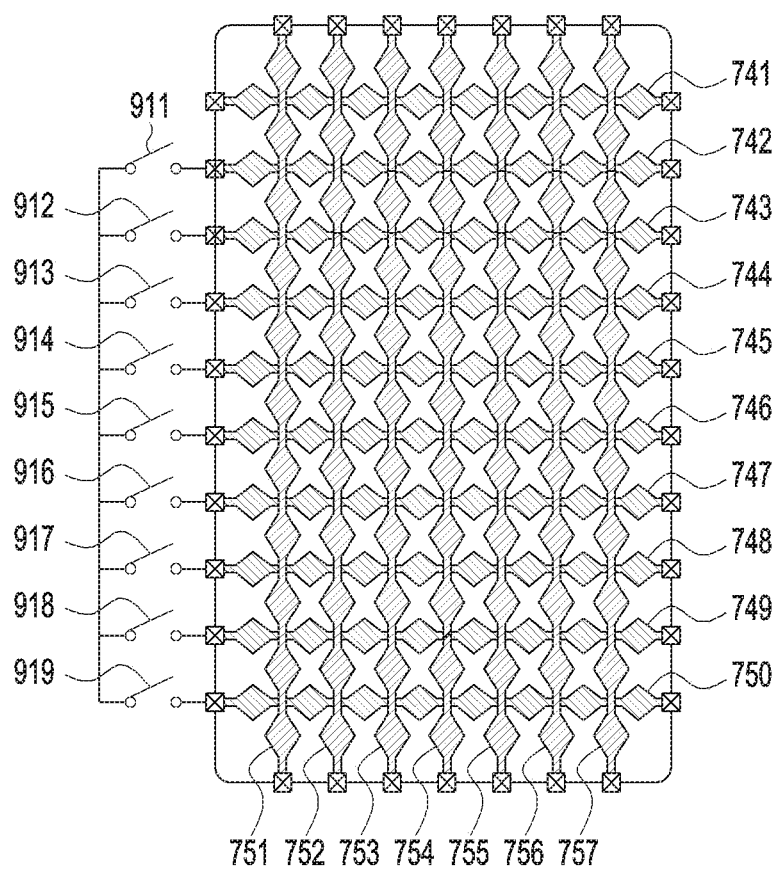
FIG. 9B is a view illustrating a sensor layer according to an embodiment of the disclosure.

FIG. 9B is a view illustrating a sensor layer according to an embodiment of the disclosure.

Referring to FIGS. 9A and 9B, a reference electrode 741 may previously be set. According to an embodiment of the disclosure, the electronic device 101 may include switches 911, 912, 913, 914, 915, 916, 917, 918, and 919 for connecting at least one of a plurality of electrodes 742 to 750, as a target electrode, to the control circuit but rather than measuring the resistance of a fixed target electrode. According to an embodiment of the disclosure, the electronic device 101 may control the turn-on/off of the switches 911, 912, 913, 914, 915, 916, 917, 918, and 919 to connect only the electrode corresponding to the position of the touch, as the target electrode, to the node 708. The electronic device 101 may control the turn-on/off of the switches 911, 912, 913, 914, 915, 916, 917, 918, and 919 to sequentially connect each of the switches to the control circuit.

Figure 10A:
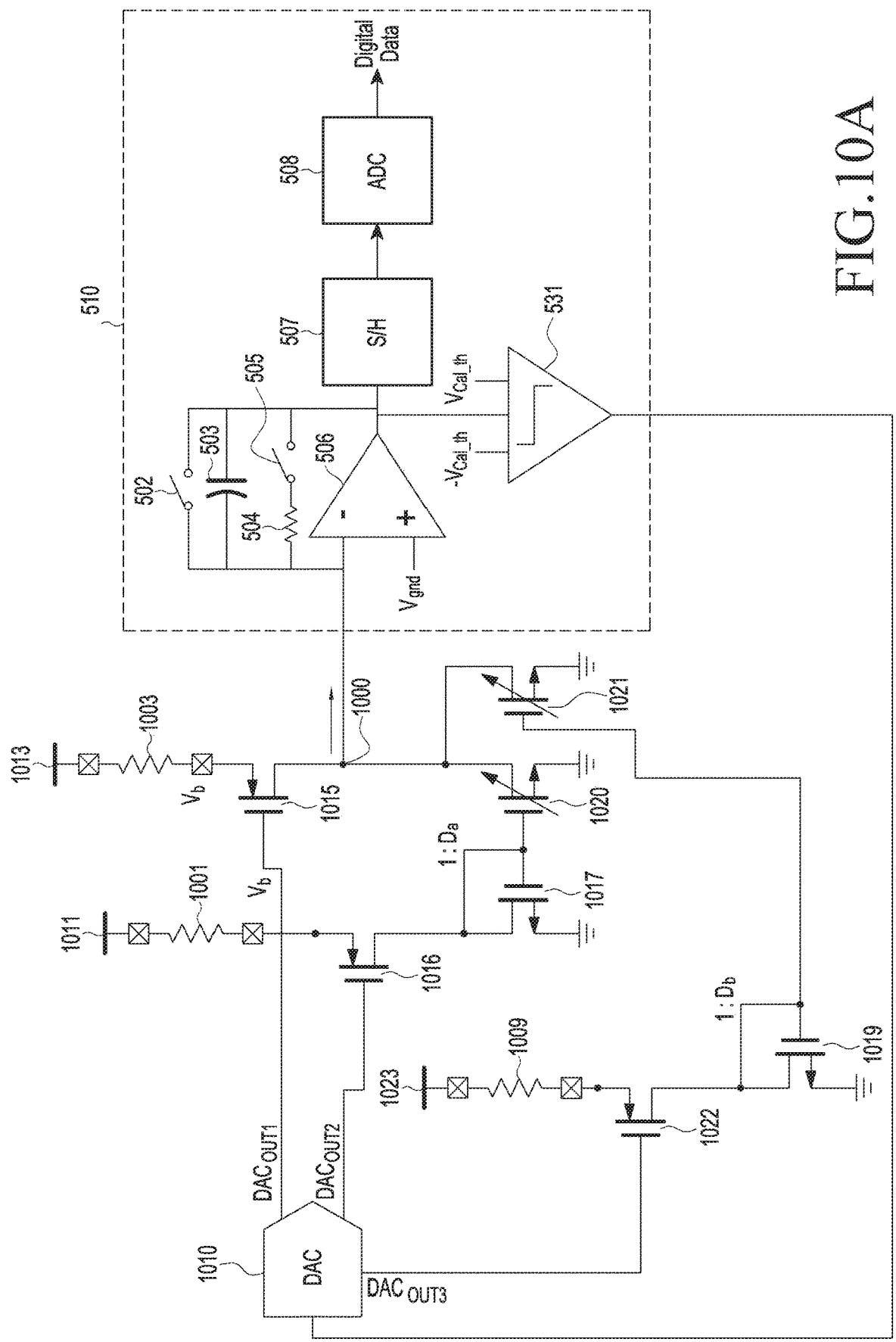
FIG. 10A is a view illustrating a circuit for detecting pressure according to an embodiment of the disclosure.

FIG. 10A is a view illustrating a circuit for detecting pressure according to an embodiment of the disclosure.

Figure 10B:
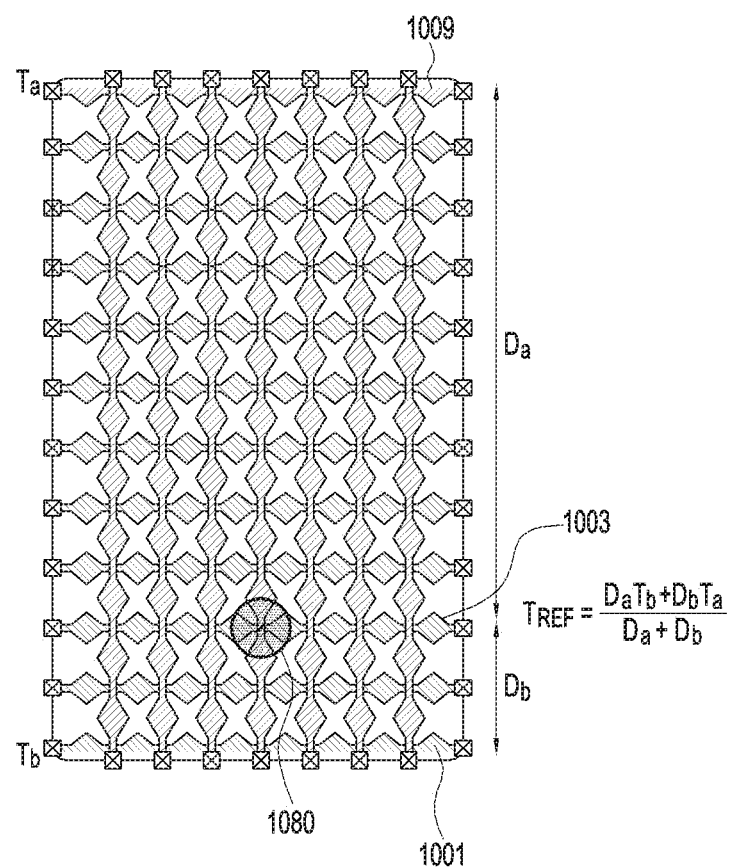
FIG. 10B is a view illustrating a sensor layer according to an embodiment of the disclosure.

FIG. 10B is a view illustrating a sensor layer according to an embodiment of the disclosure.

Referring to FIGS. 10A and 10B, according to an embodiment of the disclosure, the electronic device 101 may include a plurality of first-type electrodes (e.g., 1003) and second-type electrodes (1001 and 1009). For example, the second-type electrodes 1001 and 1009 may be arranged along the edge of the display and may be different in shape from the first-type electrodes (e.g., 1003). The second-type electrodes 1001 and 1009 may be suited as a reference electrode as they are not frequently touched. However, the second-type electrodes 1001 and 1009 may exhibit a different resistance change characteristic over temperature from the first-type electrodes due to their difference in shape from the target electrode (e.g., the electrodes 1003). For example, the second-type electrodes 1001 and 1009 may be subject to resistance changes as the temperature is changed. Where the temperature of the electrode 1009 is $T_a$, and the temperature of the electrode 1001 is $T_b$, the temperature $T_{ref}$ of the target electrode (e.g., the electrode 1003) may be $D_aT_b + D_bT_a)/(D_a + D_b)$ according to heat conduction. $D_a$ may be the distance between the electrode 1009 and the target electrode (e.g., the electrode 1003), and $D_b$ may be the distance between the electrode 1001 and the target electrode (e.g., the electrode 1003). Thus, the electronic device 101 may perform temperature compensation by adjusting the magnitude of current in the distance ratio. The target electrode (e.g., the electrode 1003) may be set to correspond to the area 1080 covering, e.g., the home button.

The DAC 1010 may output signals $DAC_{out1}$, $DAC_{out2}$, and $DAC_{out3}$ through three connecting lines. $DAC_{out1}$ may be applied to the FET 1015. $DAC_{out2}$ may be applied to the FET 1016. $DAC_{out3}$ may be applied to the FET 1022. One terminal of the target electrode (e.g., the electrode 1003) may be connected to the source of the FET 1015, and a voltage application terminal 1013 may be connected to the other terminal of the target electrode (e.g., the electrode 1003). A voltage application terminal 1011 may be connected to one terminal of a first reference electrode (e.g., the electrode 1001), and the other terminal of the first reference electrode (e.g., the electrode 1001) may be connected to the source of the FET 1016. The drain of the FET 1016 may be connected to the drain and gate of the FET 1017 and the gate of the FET 1020. The source of the FET 1017 may be grounded. The channel characteristics of the FET 1020 may be changed, and the source of the FET 1020 may be grounded. The FET 1020 may be controlled so that the ratio of the magnitude of current input to the drain of the FET 1017 to the magnitude of current input through the drain of the FET 1020 is $1:D_a$. A voltage application terminal 1023 may be connected with one terminal of a second reference electrode (e.g., the electrode 1009), and the other terminal of the second reference electrode (e.g., the electrode 1009) may be connected to the source of the FET 1022. The drain of the FET 1022 may be connected to the drain and gate of the FET 1019 and the gate of the FET 1021. The source of the FET 1019 may be grounded. The source of the FET 1021 may be grounded, and the drain of the FET 1021 may be connected to the node 1000, the drain of the FET 1015, and the drain of the FET 1020. The FET 1021 may be controlled so that the ratio of the magnitude of current input to the drain of the FET 1019 to the magnitude of current input to the drain of the FET 1021 is $1:D_b$. Accordingly, although the electrode 1003 differs in temperature coefficient than the electrodes 1001 and 1009, the temperature compensation may be carried out. The control circuit 360 may perform calibration to control the signals $DAC_{out1}$, $DAC_{out2}$, and $DAC_{out3}$ from the DAC 1010 so that the magnitude of the current output from the node 1000 remains zero under the circumstance when no pressure arises, i.e., the magnitude of current meets a designated condition. When pressure is applied to the target electrode 1003 after calibration, a non-zero current may be output from the node 1000. The control circuit 360 may identify the magnitude of pressure based on digital data resulting from sampling and conversion of the non-zero current.

Figure 11:
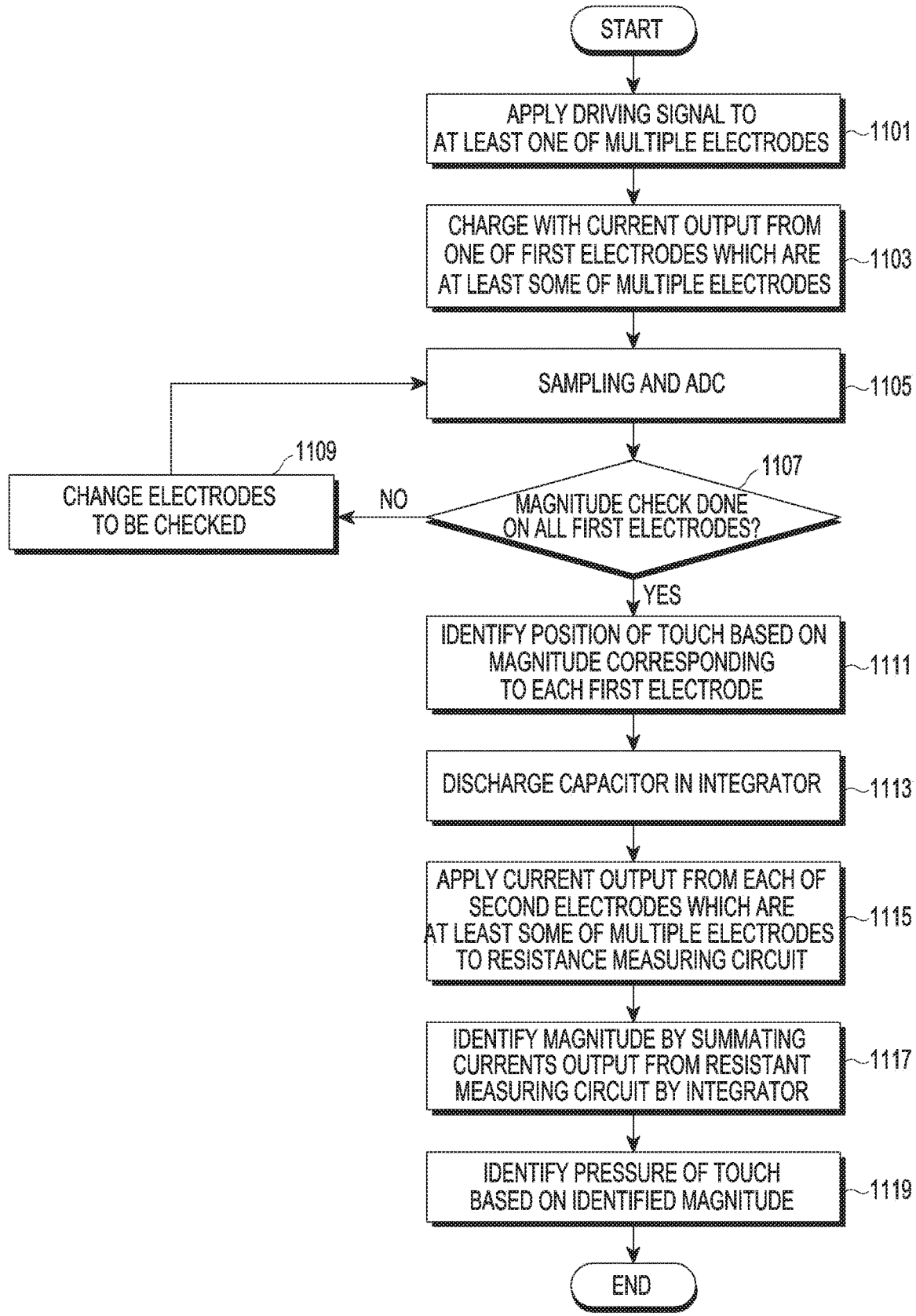
FIG. 11 is a flowchart illustrating a method for operating an electronic device according to an embodiment of the disclosure.

FIG. 11 is a flowchart illustrating a method for operating an electronic device according to an embodiment of the disclosure.

Referring to FIG. 11, according to an embodiment of the disclosure, the electronic device 101 (e.g., the control circuit 360) may apply a driving signal to at least one of a plurality of electrodes in operation 1101. The electronic device 101 may apply a driving signal first to one TX during the period of measuring the position of the touch. In operation 1103, the electronic device 101 may charge the integrator with the current output from one of the first electrodes which are at least one of the plurality of electrodes, and check the magnitude. In operation 1105, the electronic device 101 may perform sampling and ADC. For example, the electronic device 101 may sample and put on hold the output from the integrator and then convert the sampled signal into digital data, checking the magnitude. In operation 1107, the electronic device 101 may determine whether magnitude identification has been made on all the first electrodes. Unless the magnitude check has been done on all the first electrodes, the electronic device 101 may change electrodes to be identified and perform the magnitude checking operation in operation 1109. Upon changing all the TX electrodes and completing the magnitude check on all the first electrodes for the TX electrodes, the electronic device 101 may identify the position of a touch based on the magnitude corresponding to each of the first electrodes in operation 1111. In operation 1113, the electronic device 101 may discharge the capacitor of the integrator.

The electronic device 101 may identify the magnitude of pressure. In operation 1115, the electronic device 101 may apply the current output from each of the second electrodes, which are at least one of the plurality of electrodes, to a resistance measuring circuit. In operation 1117, the electronic device 101 may summate the currents from the resistant measuring circuit by using the integrator and check the magnitude. In operation 1119, the electronic device 101 may identify the magnitude of the pressure of the touch based on the checked magnitude. Upon measuring the current from each of two or more electrodes, the electronic device 101 may charge the integrator with the current from either one and then discharge, and may charge the integrator with the current from the other and then discharge.

Figure 12:
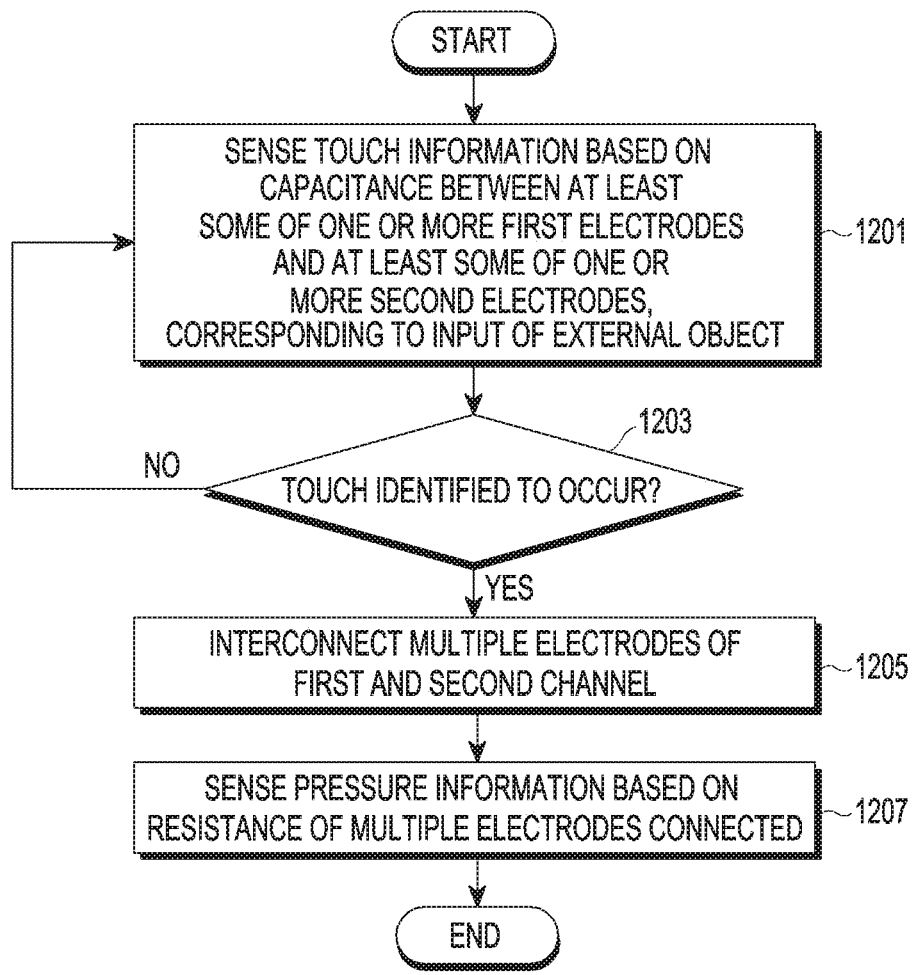
FIG. 12 is a flowchart illustrating a method for operating an electronic device according to an embodiment of the disclosure.

FIG. 12 is a flowchart illustrating a method for operating an electronic device according to an embodiment of the disclosure. The embodiment related to FIG. 12 is described in greater detail with reference to FIGS. 13A and 13B.

Figure 13A:
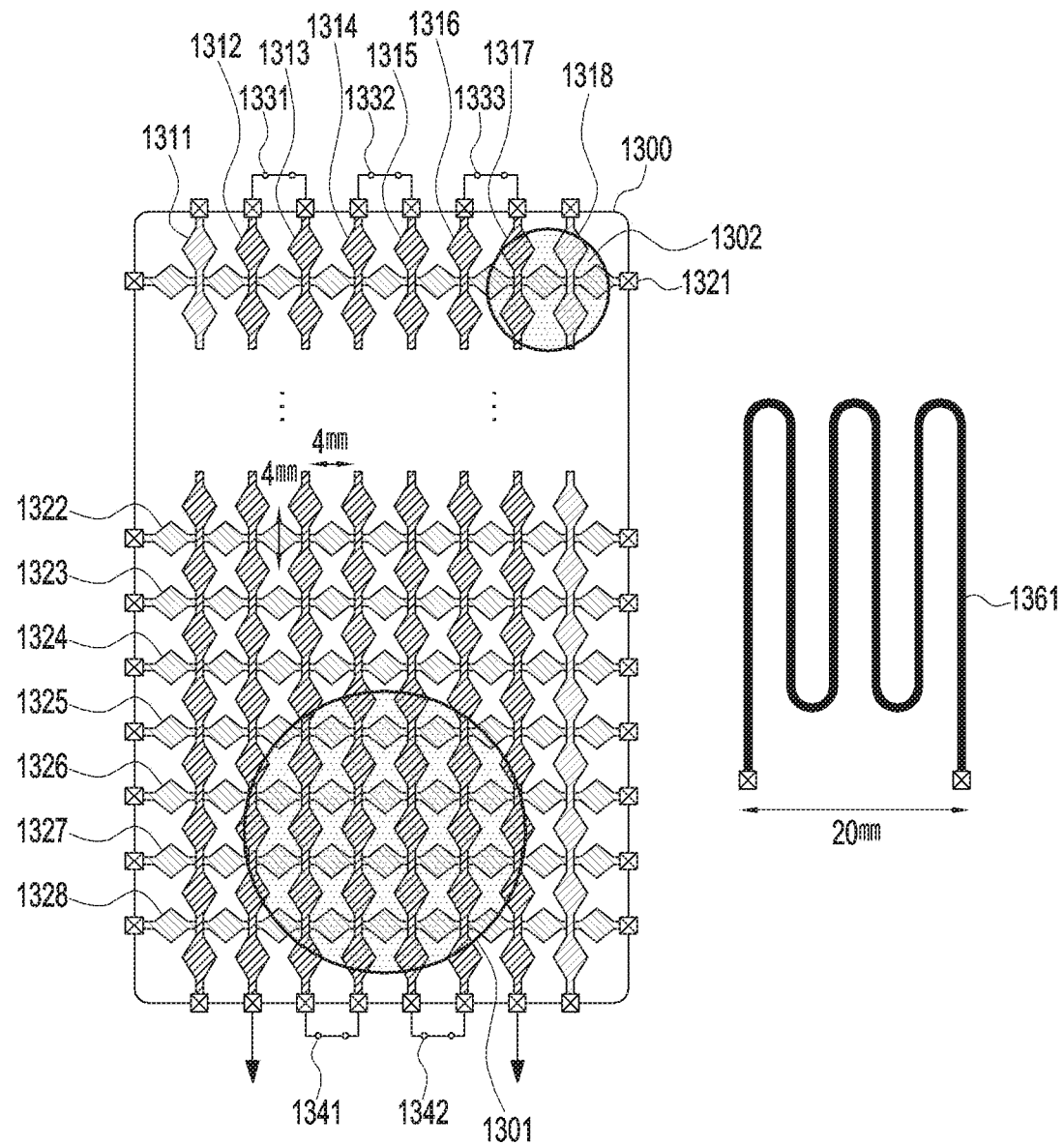
FIGS. 13A and 13B are views illustrating connections between electrodes of an electronic device according to various embodiments of the disclosure.
Figure 13B:
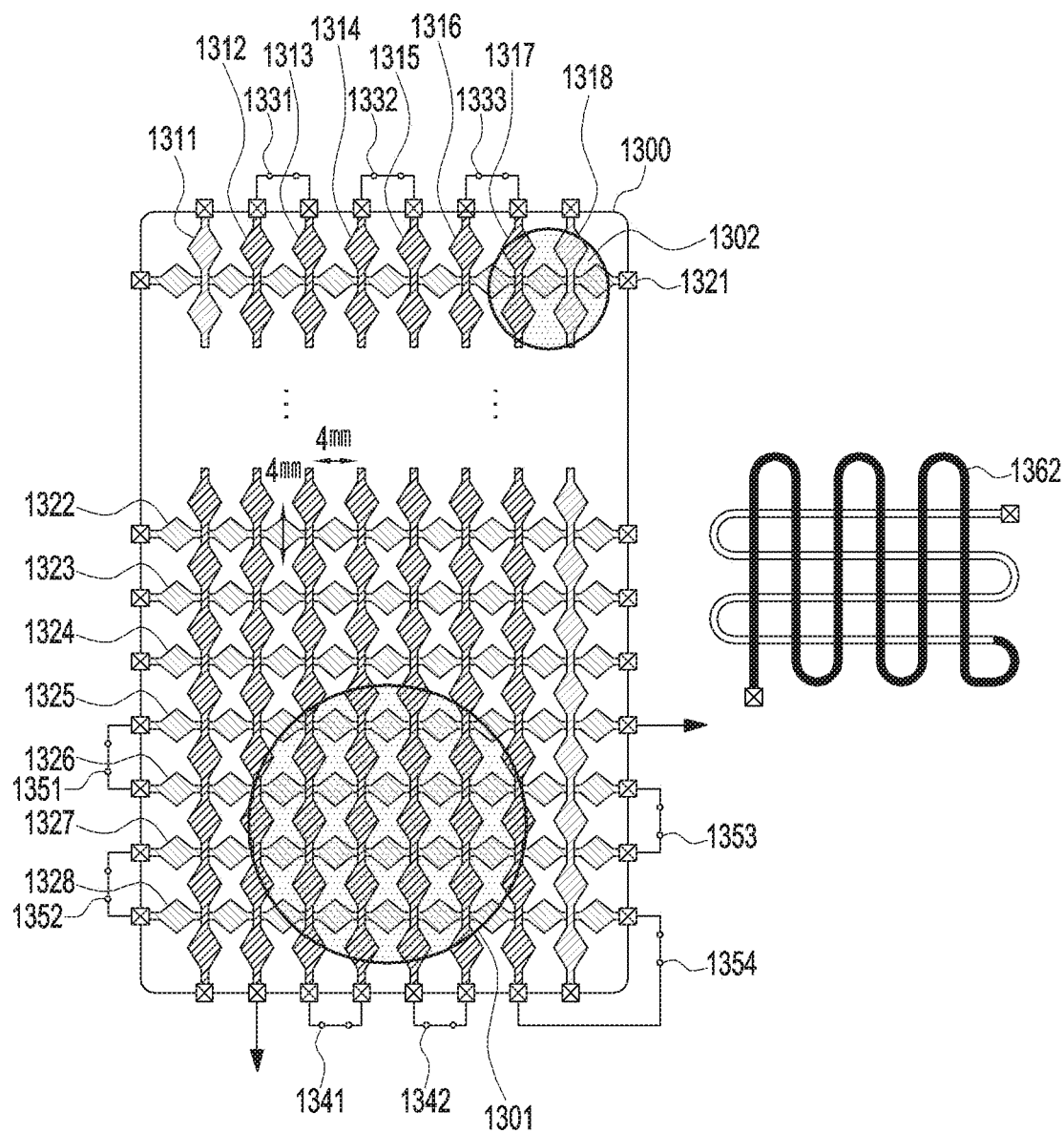

FIGS. 13A and 13B are views illustrating connections between electrodes of an electronic device according to various embodiments of the disclosure.

Referring to FIG. 12, according to an embodiment of the disclosure, the electronic device 101 (e.g., the control circuit 360), in operation 1201, may detect touch information based on the capacitance between at least one of one or more first electrodes and at least one of one or more second electrodes corresponding to an input of an external object. In operation 1203, the electronic device 101 may identify whether a touch occurs. When a touch is identified to occur, the electronic device 101 may interconnect a plurality of electrodes from among the first channel and the second channel in operation 1205. In operation 1207, the electronic device 101 may detect the pressure information based on the resistances of the plurality of electrodes interconnected.

For example, the electronic device may interconnect at least one of a plurality of electrodes 1311, 1312, 1313, 1314, 1315, 1316, 1317, 1318, and 1319 as shown in FIG. 13A.

Referring to FIG. 13A, the electrodes 1311, 1312, 1313, 1314, 1315, 1316, 1317, 1318, and 1319 and the electrodes 1321, 1322, 1323, 1324, 1325, 1326, 1327, and 1328 may be implemented in a mesh. The electronic device 101 may include switches 1331, 1332, 1333, 1341, and 1342 for interconnecting the plurality of electrodes during the period of measuring pressure. The switches 1331, 1332, 1333, 1341, and 1342 may be turned on during the pressure measuring period, so that the electrode 1312, the electrode 1313, the electrode 1314, the electrode 1315, the electrode 1316, and the electrode 1317 may be connected together, forming a single electrode 1361 as shown on the right. Although FIG. 13A is illustrated as if the electrodes positioned adjacent to each other are connected to each other, this is merely an example, and the electronic device 101 may interconnect electrodes which are not positioned adjacent to each other. Further, the electronic device 101 may connect the electrodes in series according to an embodiment or in parallel alternatively. One electrode 1361 may cover a broader area 1301 and present a higher resistance than individual electrodes do. As it has a higher resistance, the change in resistance may increase. The electronic device 101 may measure pressure more accurately. According to an embodiment of the disclosure, the electronic device 101 may be configured to interconnect a plurality of electrodes when the pressure detecting period arrives, without identifying whether a touch arises.

Meanwhile, according to an embodiment of the disclosure, the electronic device 101 may interconnect the electrodes corresponding to another area 1302 and measure a different factor (e.g., temperature) than pressure, using the interconnected electrodes. For example, the temperature may also influence the resistance of the electrodes connected. Thus, the electronic device 101 may measure the temperature of the sensor layer 1300 based on a change in resistance.

Referring to FIG. 13B, the electronic device 101 may be configured to interconnect not only electrodes along one axis but also electrodes along another axis. For example, the electronic device 101 may turn on additional switches 1351, 1352, 1353, and 1354. Accordingly, the electrode 1312, the electrode 1313, the electrode 1314, the electrode 1315, the electrode 1316, the electrode 1317, the electrode 1328, the electrode 1327, the electrode 1326, and the electrode 1325 may be interconnected, forming a single electrode 1362 as shown on the right. The electrode 1362 may have a higher resistance than the electrode 1361 of FIG. 13A. According to an embodiment of the disclosure, not only electrodes arranged on the same layer but electrodes arranged on different layers may be connected.

FIGS. 14A, 14B, 14C, 14D, 14E, and 14F are views illustrating a position of a switch interconnecting electrodes according to various embodiments of the disclosure.

Figure 14A:
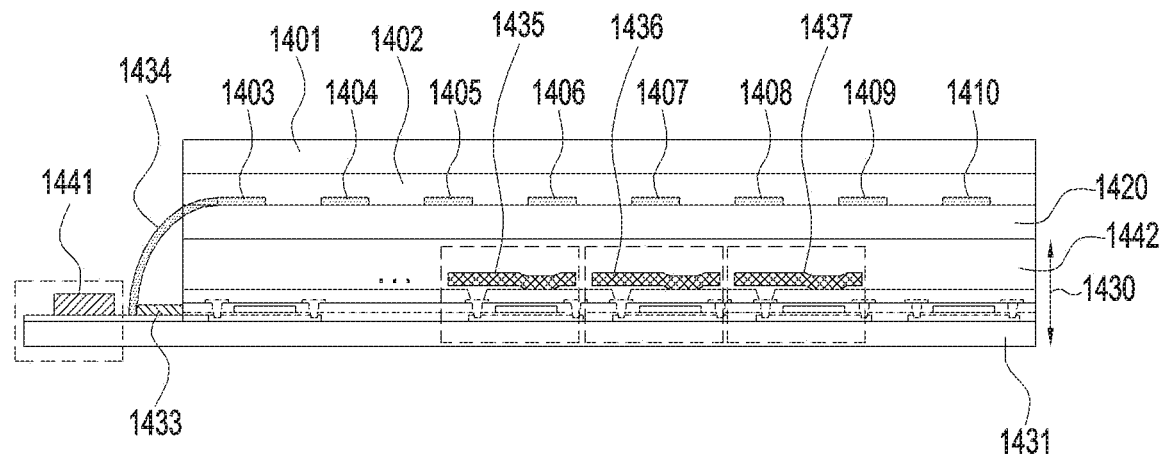
FIGS. 14A, 14B, 14C, 14D, 14E, and 14F are views illustrating a position of a switch interconnecting electrodes according to various embodiments of the disclosure.

Referring to FIG. 14A, a touch panel 1420 may be disposed on a display circuit 1430. Electrodes 1403, 1404, 1405, 1406, 1407, 1408, 1409, and 1410 may be situated on the touch panel 1420, and a transparent adhesive layer 1402 may be disposed on the electrodes 1403, 1404, 1405, 1406, 1407, 1408, 1409, and 1410, and a cover window 1401 may be placed on the adhesive layer 1402. The display circuit 1430 may include a substrate layer 1431 (e.g., a polymer layer or glass). A red subpixel 1435, a green subpixel 1436, and a blue subpixel 1437 may be arranged on the substrate layer 1431. Further, a switch 1441 may be provided on the substrate layer 1431 to interconnect the electrodes. Both terminals (drain/source) of the switch 1441 may be connected to other electrodes (e.g., the electrodes 1312 and 1313) through a terminal line 1433 and a connecting line 1434. An encapsulating layer 1442 may be disposed on a red light emission structure 1435, a green light emission structure 1436, and a blue light emission structure 1437.

Figure 14B:
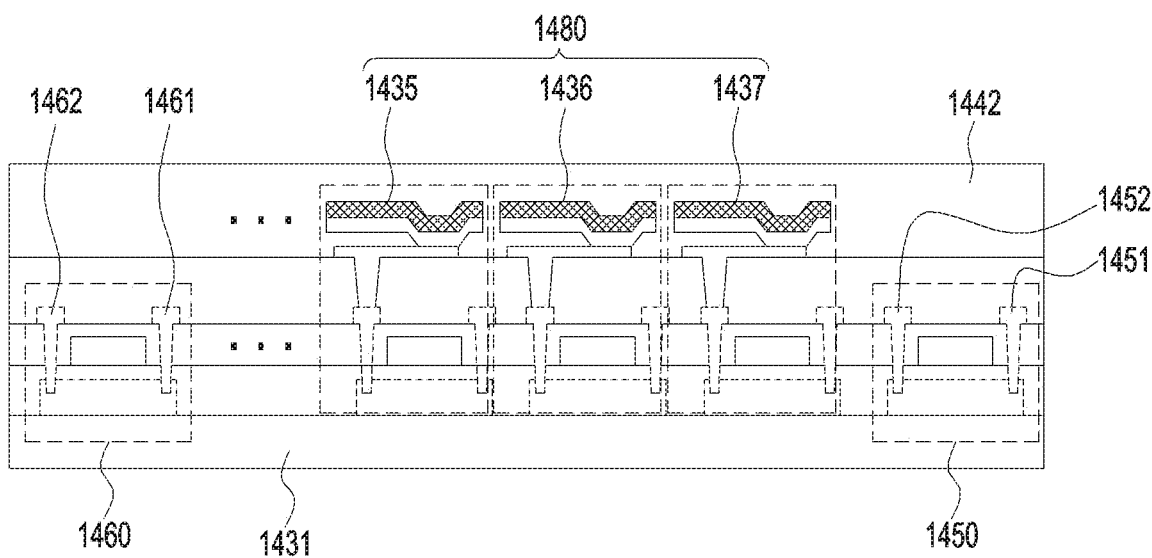
Figure 14C:
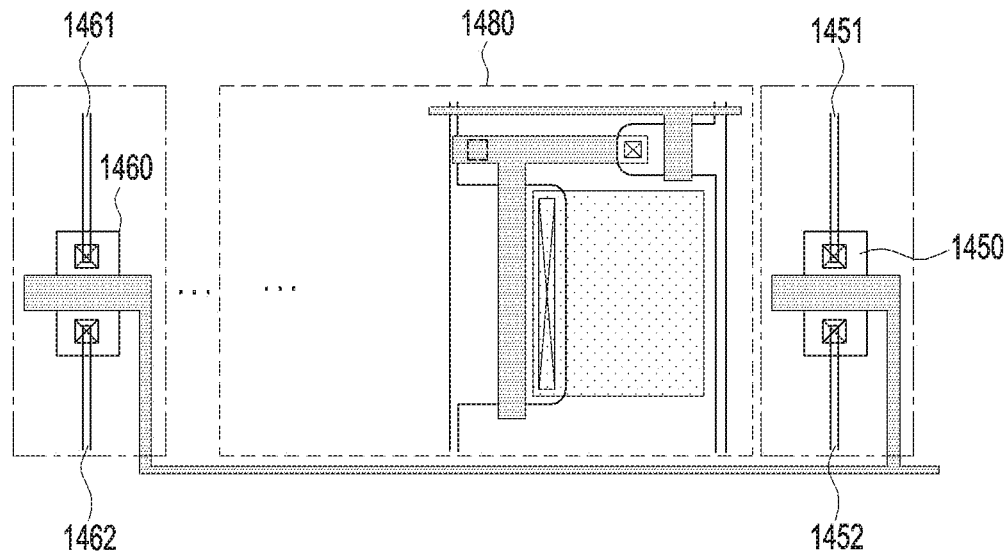
Figure 14D:
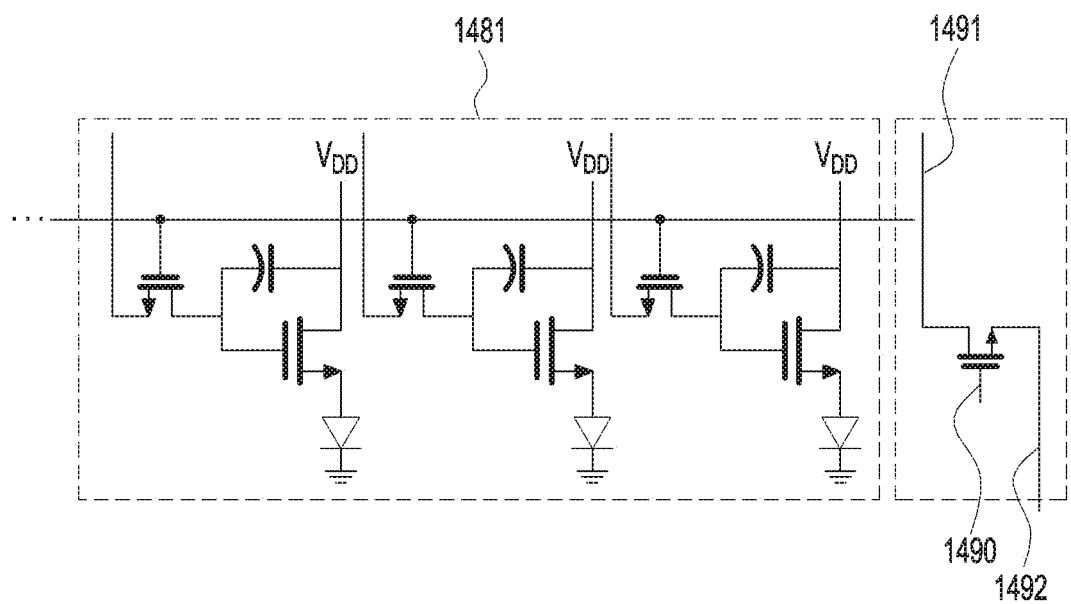

Referring to FIGS. 14B and 14C, the display circuit 1480 including at least one light emission structure 1435, 1436, and 1437 may be disposed on a portion of the substrate layer 1431. Switches 1450 and 1460 for interconnecting electrodes may be disposed on other portions of the substrate layer 1431. The switch 1450 may connect to a connecting line 1451 connected to one electrode and a connecting line 1452 connected to another electrode. The switch 1460 may connect to a connecting line 1461 connected to one electrode and a connecting line 1462 connected to another electrode. FIG. 14D illustrates a circuit diagram corresponding to FIGS. 14B and 14C. Referring to FIG. 14D, a switch 1490 may be positioned adjacent to an organic light emitting diode (OLED) display circuit 1481. The switch 1490 may connect to a connecting line 1491 for connection to one electrode and a connecting line 1492 for connection to another electrode. When the switch 1490 is turned on, the electrodes may be interconnected through the connecting lines 1491 and 1492. The position or implementations of the switches for interconnecting electrodes as shown in FIGS. 14A to 14D are merely an example, and the switches are not limited thereto.

Figure 14E:
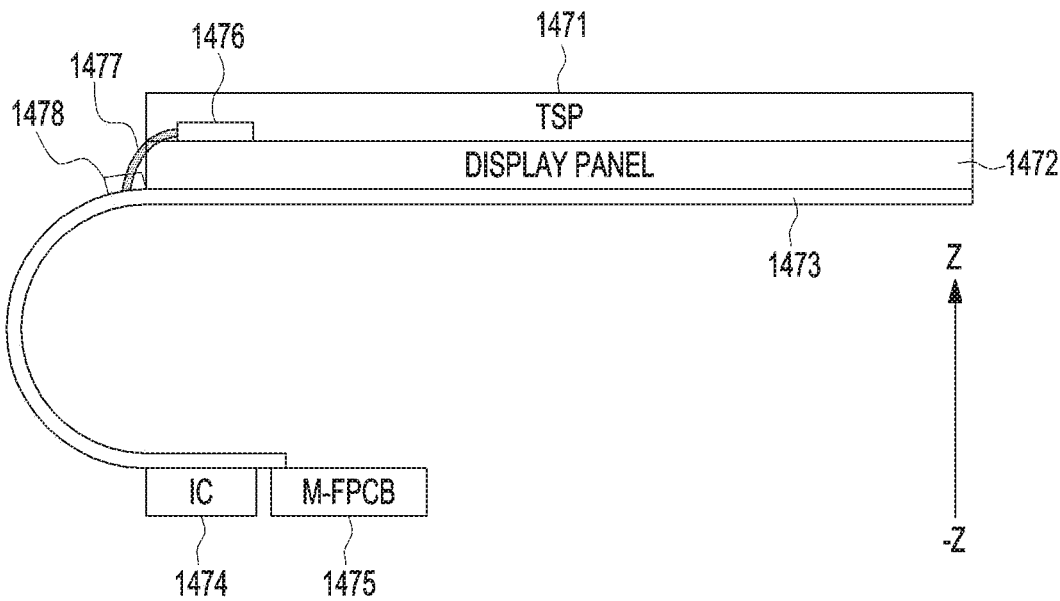
Figure 14F:
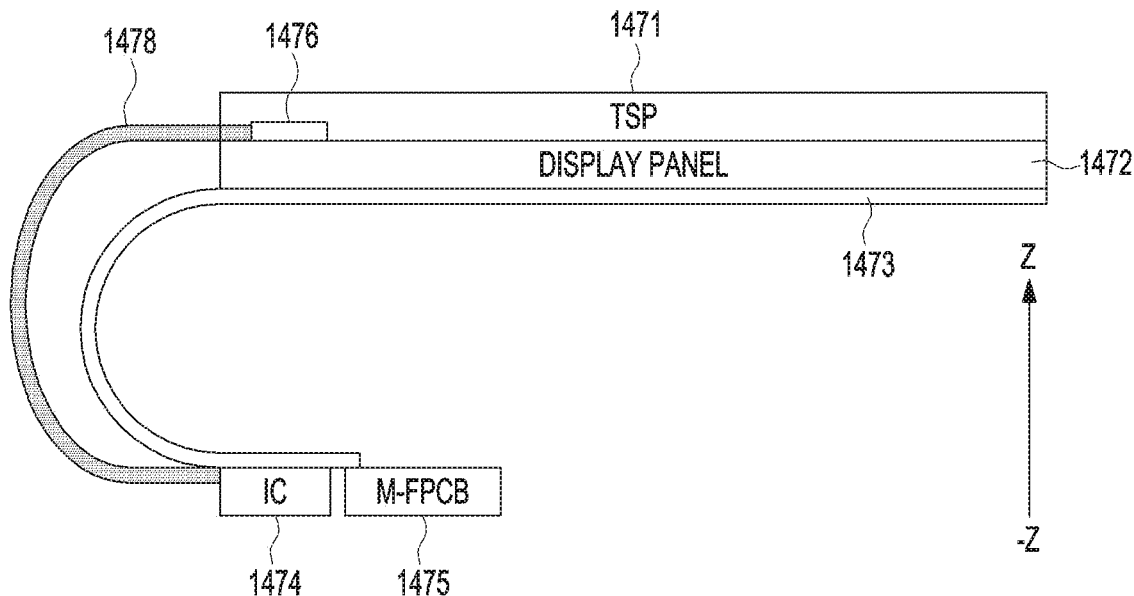

Referring to FIGS. 14E and 14F, the electronic device 101 may include a touchscreen panel (TSP) 1471, a display panel 1472, a substrate layer 1473, an integrated circuit (IC) 1474 (e.g., a display driver integrated circuit (DDI)), and a flexible printed circuit board 1475. At least one electrode 1476 may be disposed on the TSP 1471, and a switch 1478 may be situated between electrodes on the substrate layer 1473. The electrode 1476 may be connected via a connecting line 1477, and when the switch 1478 is turned on, the electrodes may be interconnected.

According to an embodiment of the disclosure, the display panel may include a plurality of pixels.

Each of the plurality of pixels may include a red subpixel, a green subpixel, and a blue subpixel. Alternatively, each of the plurality of pixels may include a red subpixel, a green subpixel, a blue subpixel, and another green subpixel. Alternatively, each of the plurality of pixels may include a red subpixel, a green subpixel, a blue subpixel, and a white subpixel.

According to an embodiment of the disclosure, the display panel 1472 may include a display substrate layer, a thin film transistor (TFT) array, an organic light emitting layer, and a thin film encapsulation (TFE) layer.

The display substrate layer may be a base layer that functions as the base of the display panel. The display substrate layer may be formed of a flexible polymer material, but it is not limited thereto.

The substrate layer 1473 may be displayed in the −z direction of the display panel 1472 (e.g., under the display panel 1472). The substrate layer 1473 may include lines for supplying power and/or signals to the display panel 1472. According to an embodiment of the disclosure, the substrate layer 1473 may be formed of a bendable material, extending from one end of the display panel 1472 up to the flexible printed circuit board 1475.

The substrate layer 1473 may be formed of a flexible material. A TFT array may be disposed on the top of the substrate layer 1473, and a first adhesive layer may be attached to the bottom of the substrate layer 1473.

The substrate layer 1473 may include a first polymer layer and a second polymer layer under the first polymer.

According to an embodiment of the disclosure, the first polymer layer and the second polymer layer may include at least one of polyehyleneterephthalate, polymethylmethacrylate, polyamide, polyimide, polypropylene, or polyurethane.

According to an embodiment of the disclosure, the first polymer layer may be formed of a flexible material, e.g., polyimide.

According to an embodiment of the disclosure, the second polymer layer may be provided to support the first polymer and be formed of polyehyleneterephthalate. According to an embodiment of the disclosure, the TFT array may be disposed on the top of the substrate layer 1473. The TFT array may be formed of an array of a plurality of transistors in a thin film form. The TFT array may be electrically connected to the pixels in the active area of the display panel 1472, driving the pixels.

An organic light emitting layer with a plurality of pixels may be formed on the top of the TFT array. The pixels each may include subpixels. Each subpixel may be formed of a light emitting device. The light emitting device may include an organic light emitting diode containing an organic substance.

According to an embodiment of the disclosure, the organic light emitting layer may be a self-emissive layer when fed electricity and contain a red, green, or blue fluorescent or organic phosphorous compound. The organic light emitting layer may be not overlapped by the opening at least partially as viewed from above the front of the housing.

According to an embodiment of the disclosure, the organic light emitting layer may include a cathode electrode, an anode electrode, and an organic light emitting device and be deposited on the TFT array.

The organic light emitting layer may be disposed towards the transparent layer. The pixels formed in the organic light emitting layer may be vulnerable to oxygen or moisture from the outside.

According to an embodiment of the disclosure, the display may include a TFE layer to prevent each pixel and the organic light emitting layer from being exposed to oxygen or moisture from the outside. A buffer layer for flattening the TFE layer may be added on the TFE layer.

According to an embodiment of the disclosure, the TFT array may be a buffer layer. The buffer layer may prevent infiltration of impurities into the substrate layer 1473, providing a flat film on the substrate layer 1473. The TFT array which is a buffer layer may be formed of various materials capable of flattening. For example, the buffer layer may contain an inorganic material, such as glass, synthetic resin (PET), silicon oxide, silicon nitride, silicon oxynitride, aluminum oxide, aluminum nitride, titanium oxide, or titanium nitride, or an organic material, such as polyimide, polyester, or acrylic. The buffer layer may be deposited by various deposition methods, such as plasma enhanced chemical vapor deposition (PECVD), atmospheric pressure CVD (APCVD), or low pressure CVD (LPCVD).

According to an embodiment of the disclosure, the TFE layer may include at least one of an organic layer, an inorganic layer, an organic metal layer, and/or a silicate layer, covering the organic light emitting layer. The TFE layer may prevent the organic light emitting layer from oxydized by oxygen and moisture. The TFE layer may be formed of a stack of one or more organic layers and one or more inorganic layers alternately and repetitively layered one over another.

When a plurality of organic layers and a plurality of inorganic layers are repetitively layered one over another, the uppermost layer may be formed of an inorganic layer to prevent infiltration of moisture into the organic light emitting layer more effectively.

According to an embodiment of the disclosure, the organic layers may include one of, or a compound of, aluminum tris 8-hydroxyquinoline, phthalocyanines, naphthalocyanines, and polycyclic aromatics. The inorganic material may include one, or a combination, of laser induced fluorescence (LIF), magnesium fluoride ($MgF_2$), and calcium fluoride ($CaF_2$).

According to an embodiment of the disclosure, the TFE layer may include a functional layer in addition to at least one of an organic layer, an inorganic layer, an organic metal layer, and/or a silicate layer, covering the organic light emitting layer. The functional layer includes any one of an etch resistant material selected from silanes, hardcoat layers, photoresist layers, antiglare layers, antireflective layers, impact protective coatings, and antismear/fingerprint coatings, siloxanes, hexafluorobenzene, pentafluorostyrene, perfluoro-1, 3-butadiene, chlorocarbon compounds, and thermoplastic polymers.

The IC 1474 may be disposed on a portion of the substrate layer 1473. The DDI may control the pixels through the substrate layer 1473.

According to an embodiment of the disclosure, a film may be disposed between the IC 1474 and the substrate layer 1473. In other words, the film may be attached to one end of the substrate layer 1473, and the IC 1474 may be disposed on the film.

The flexible printed circuit board 1475 may electrically connect to a portion of the substrate layer 1473. For example, the flexible printed circuit board 1475 may electrically connect to a conductive pattern (or a line) formed on the substrate layer 1473. As used herein, the flexible printed circuit board 1475 may be referred to as a module-flexible printed circuit board (M-FPCB).

The embodiment described in connection with FIGS. 14E and 14F are merely an example, and the stacked structure and components of the electronic device 101 are not limited to those illustrated in FIGS. 14E and 14F. For example, the display may be configured in a chip-on-film (COF) scheme where various parts are arranged on a thin film or in a chip-on-glass (COG) scheme where the DDI 23 is mounted on a glass substrate.

According to an embodiment of the disclosure, a conductive layer may be added between the TSP 1471 and the display panel 1472. The conductive layer may be operated as a ground to block off noise from the display panel 1472 under the control of a touch driving or pressure driving circuit, or as an active electronic shield that is driven in the same driving waveform as a touch driving waveform or pressure driving waveform or driven by DC voltage.

According to an embodiment of the disclosure, the switch that is able to interconnect the plurality of electrodes 1476 of the TSP 1471 may be formed on the substrate layer 1473, and the switch may be electrically connected to the electrode 1476 via a line 1477. As shown in FIG. 14F, the switch that is able to interconnect the plurality of electrodes 1476 may be embedded in the IC 1474, in which case the electrode 1476 may be connected to the IC 1474 via a line 1478.

Figure 15A:
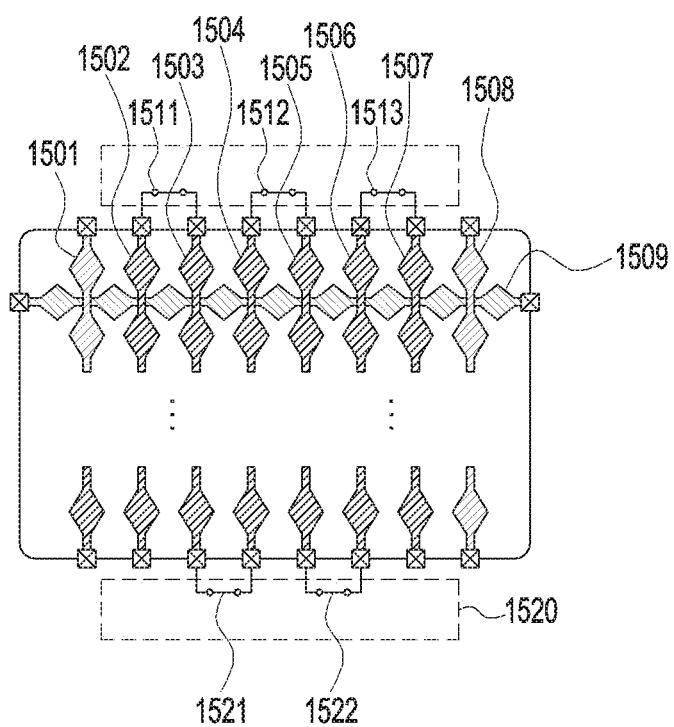
FIGS. 15A, 15B, and 15C are views illustrating a state of a switch and a shape of an electrode where a position of a touch and a magnitude of a pressure are detected according to various embodiments of the disclosure.
Figure 15B:
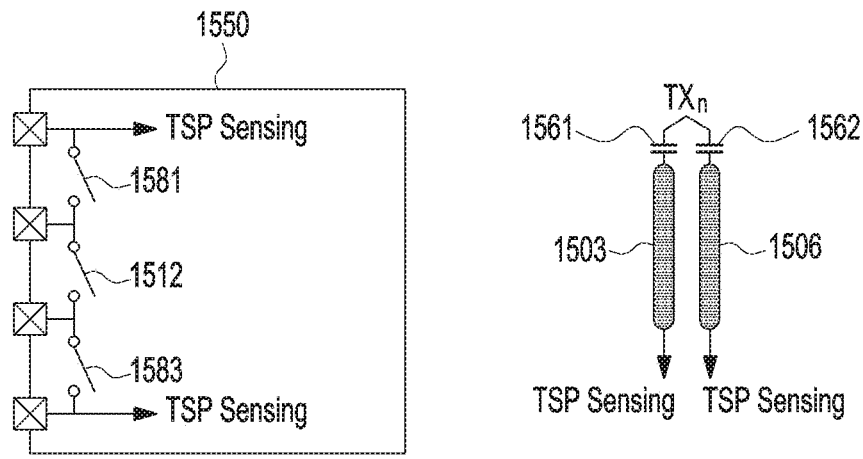
Figure 15C:
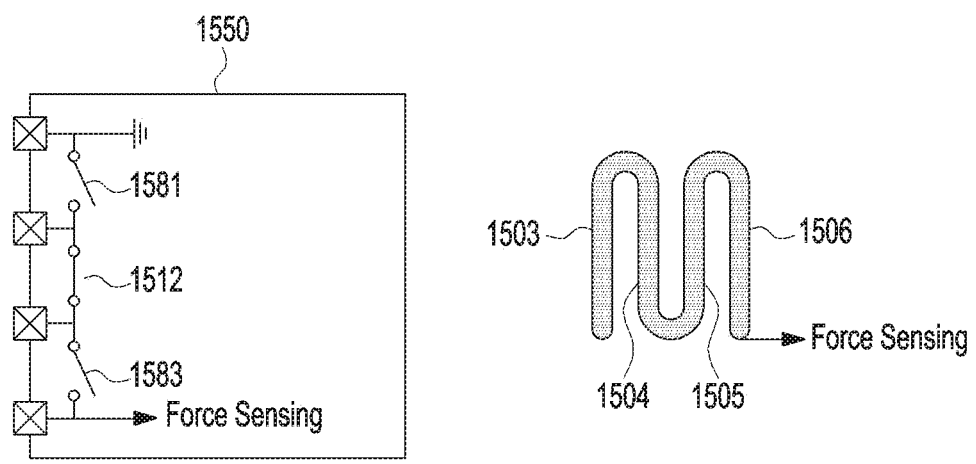

FIGS. 15A, 15B, and 15C are views illustrating a state of a switch and a shape of an electrode when a position of a touch and a magnitude of pressure are detected according to various embodiments of the disclosure.

Referring to FIG. 15A, an electronic device may include a plurality of electrodes 1501, 1502, 1503, 1504, 1505, 1506, 1507, 1508, and 1509, a first switching circuit 1510 including switches 1511, 1512, and 1513 for connecting the electrodes, and a second switching circuit 1520 including switches 1521 and 1522.

A control circuit 1550 (e.g., the control circuit 360) may turn off the switches 1581, 1512, and 1583 upon detecting the position of a touch as shown in FIG. 15B. Although not shown in FIG. 15A, the electronic device 101 may further include a switch 1581 for selectively connecting the electrode 1503 and the electrode 1504 on the upper end and a switch 1583 for connecting the electrode 1505 and the electrode 1506 on the upper end. Thus, the electrode 1503 and the electrode 1506 may not be connected as shown on the right of FIG. 15B. The control circuit 1550 may measure the capacitance 1561 between the nth TX electrode $TX_n$ and the electrode 1503 and the capacitance 1562 between the nth TX electrode $TX_n$ and the electrode 1506 and may identify the position of a touch based on the results of measurement.

Upon detecting the magnitude of the pressure, the control circuit 1550 may turn on the switch 1512 as shown in FIG. 15C while turning off the switches 1581 and 1583. Although not shown, the control circuit 1550 may turn on the switches 1521 and 1522. One terminal of the electrode 1503 may be connected to the electrode 1504, and the control circuit 1550 may connect the other terminal of the electrode 1503 to the ground 1551. Accordingly, the electrodes 1503, 1504, 1505, and 1506 may be connected as shown on the right of FIG. 15C, and one terminal of the electrode 1506 may be connected to a pressure (or force) detecting circuit. The electronic device 101 may identify the magnitude of pressure based on the resistance of the electrodes 1503, 1504, 1505, and 1506 connected.

Figure 16:
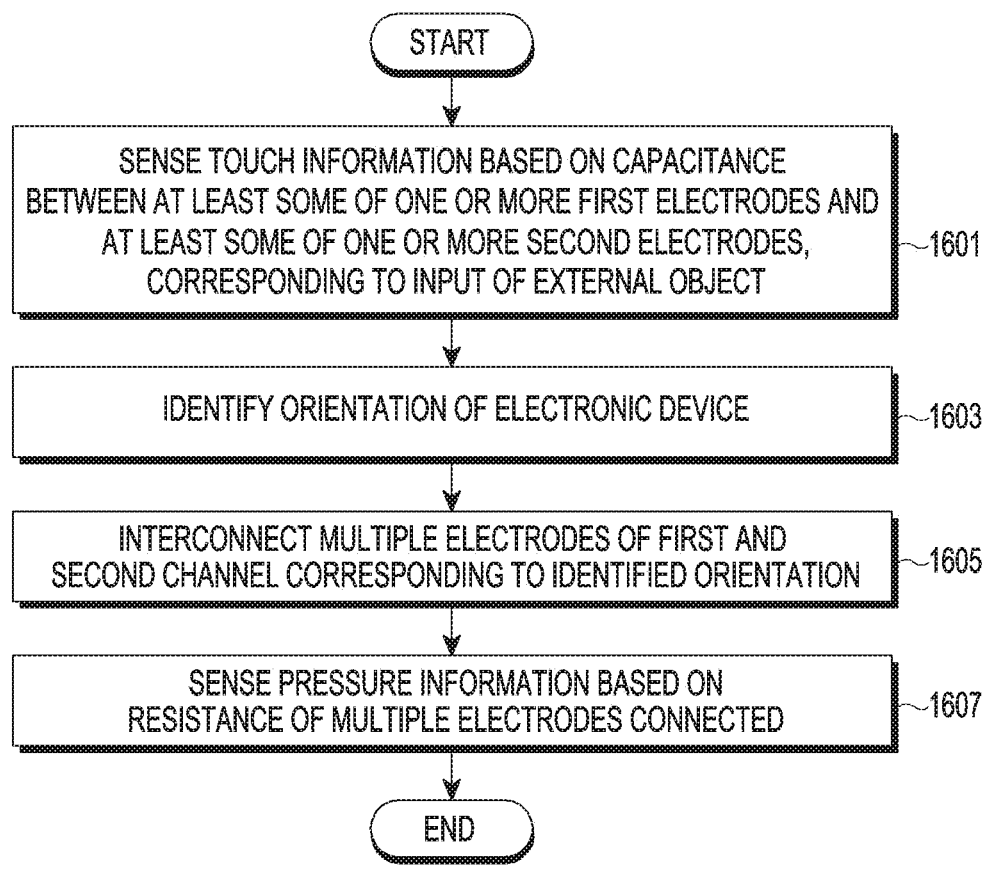
FIG. 16 is a flowchart illustrating a method for operating an electronic device according to an embodiment of the disclosure.

FIG. 16 is a flowchart illustrating a method for operating an electronic device according to an embodiment of the disclosure. The embodiment shown in FIG. 16 is described in greater detail with reference to FIG. 17.

Figure 17:
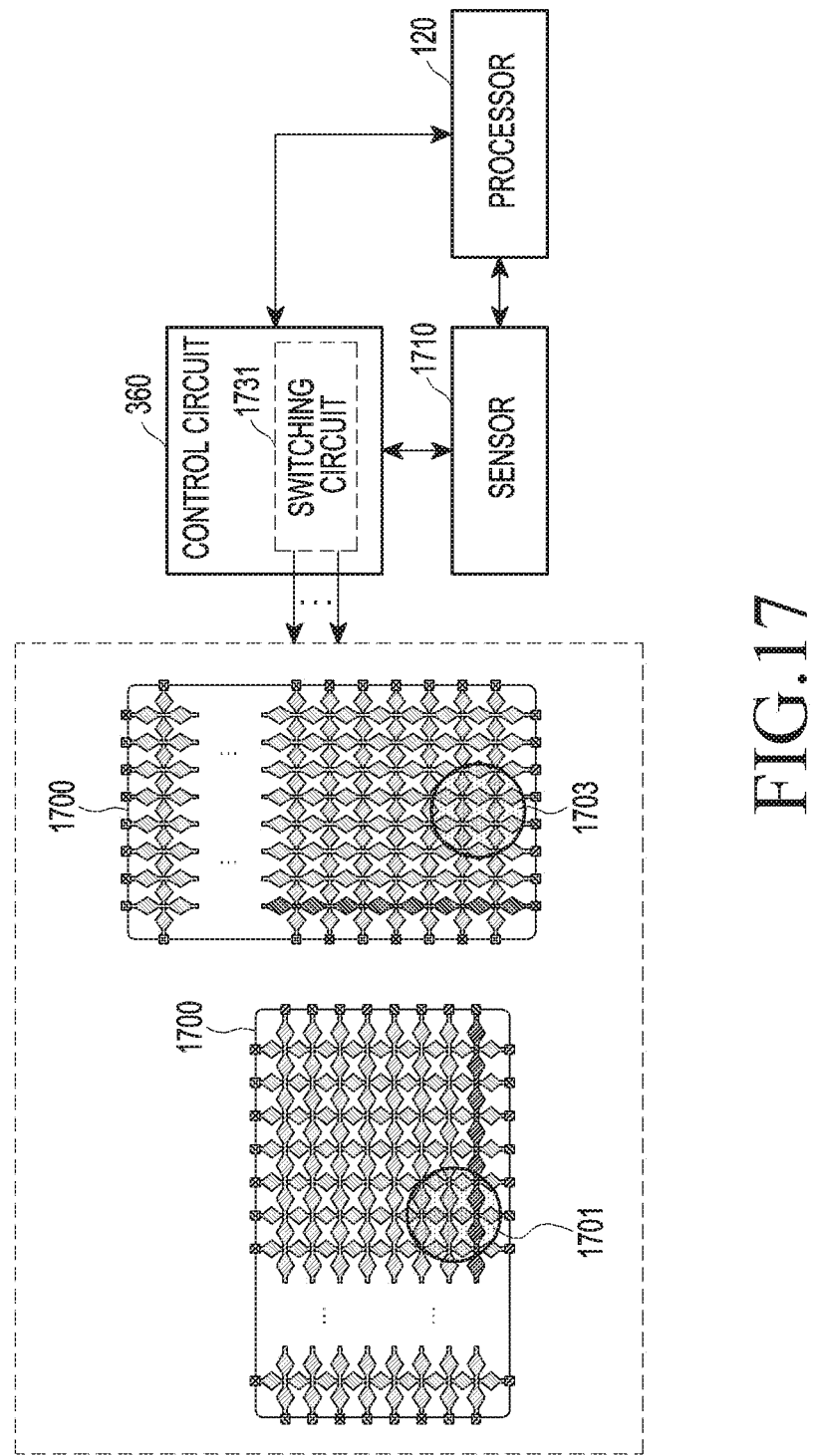
FIG. 17 is a block diagram illustrating an electronic device according to an embodiment of the disclosure.

FIG. 17 is a block diagram illustrating an electronic device according to an embodiment of the disclosure.

Referring to FIGS. 16 and 17, according to an embodiment of the disclosure, the electronic device 101 (e.g., the control circuit 360), in operation 1601, may detect touch information based on the capacitance between at least one of one or more first electrodes and at least one of one or more second electrodes corresponding to an input of an external object. In operation 1603, the control circuit 360 may identify the orientation of the electronic device 101. The orientation of the electronic device 101 may be measured by the sensor 1710 (e.g., at least one of a gyro sensor or an acceleration sensor), and the control circuit 360 may directly obtain orientation information from the sensor 1710. Alternatively, the control circuit 360 may receive orientation information or a switching control signal generated based on the orientation information. According to an embodiment of the disclosure, the control circuit 360 may receive a switching circuit control signal generated based on at least one of information about a state or operation mode (e.g., underwater mode), type of application, or resource currently being displayed on the screen (e.g., information about the area where a menu button is displayed, information about the area where a short-cut icon is displayed on the home screen, or information about the area where a thumbnail image is displayed on the gallery)

In operation 1605, the control circuit 360 may interconnect a plurality of electrodes of the first channel and the second channel corresponding to the identified orientation. For example, when the sensor layer 1700 is oriented in the horizontal direction, the turn-on/off of each switch in the switching circuit 1731 may be controlled to interconnect the electrodes covering the first area 1701 where the home button is displayed. When the sensor layer 1700 is oriented in the vertical direction, the turn-on/off of each switch in the switching circuit 1731 may be controlled to interconnect the electrodes covering the second area 1703 where the home button is displayed. In operation 1607, the electronic device 101 may detect the pressure information based on the resistances of the plurality of electrodes interconnected.

Figure 18:
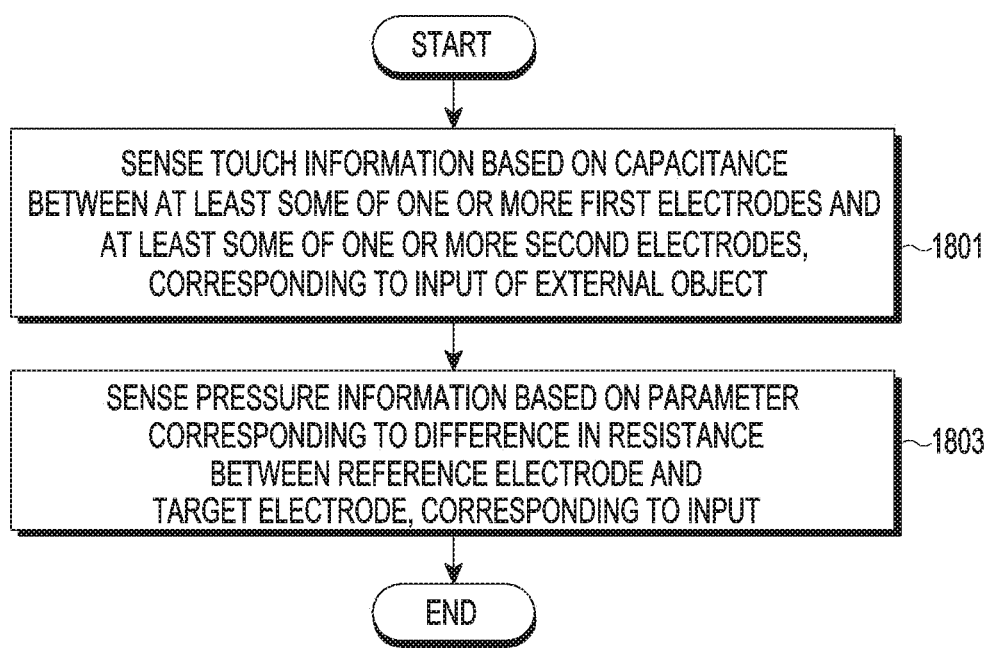
FIG. 18 is a flowchart illustrating a method for operating an electronic device according to an embodiment of the disclosure.

FIG. 18 is a flowchart illustrating a method for operating an electronic device according to an embodiment of the disclosure.

Referring to FIG. 18, according to an embodiment of the disclosure, the electronic device 101 (e.g., the control circuit 360), in operation 1801, may detect touch information based on the capacitance between at least one of one or more first electrodes and at least one of one or more second electrodes corresponding to an input of an external object. In operation 1803, the electronic device 101 may detect pressure information based on the parameter corresponding to the difference in resistance between the reference electrode and the electrode targeted for measurement, corresponding to the input. The target electrode may be subject to changes in its specific resistance due to temperature changes, and such temperature varying environment may render it difficult to measure the magnitude of pressure precisely. Meanwhile, when the resistance change characteristic of the reference electrode over temperature is substantially the same as the resistance change characteristic of the target electrode over temperature, the reference electrode may also be subject to changes in its specific resistance according to temperature changes. The electronic device 101 may identify only changes in resistance by pressure based on the difference in resistance between the target electrode and the reference electrode and may more accurately identify the magnitude of pressure based thereupon.

Figure 19:
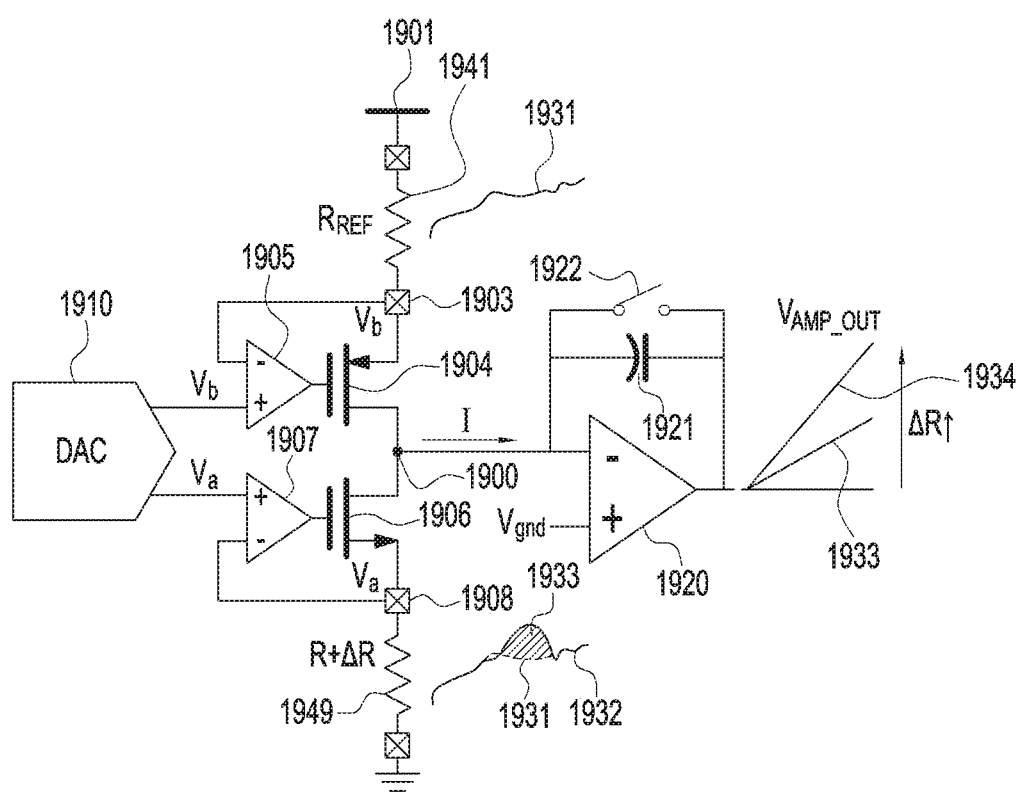
FIG. 19 is a view illustrating a pressure measuring circuit according to an embodiment of the disclosure.

FIG. 19 is a view illustrating a pressure measuring circuit according to an embodiment of the disclosure.

Referring to FIG. 19, according to an embodiment of the disclosure, in the electronic device 101, a terminal of the reference electrode 1941 may be connected to a voltage application terminal 1901 during the period of measuring period, and accordingly, a reference voltage $V_{DD}$ may be applied to the terminal of the reference electrode 1941. The pressure detecting circuit may include a voltage source capable of producing the reference voltage $V_{DD}$, e.g., a voltage source for detecting the position of a touch, and may further include a separate voltage source. During the period of measuring the position of the touch, the reference electrode 1941 is operated as an RX electrode, and may thus be not connected to the voltage application terminal 1901. Although not shown, a switch may be connected between the reference electrode 1941 and the voltage application terminal 1901. The resistance of the reference electrode 1941 may be $R_{REF}$. The other terminal of the electrode 1941 may be connected to a node 1903 which may be connected to the source of the FET 1904 and the negative (−) terminal of the amplifier 1920. The voltage at the node 1903 may be $V_b$. The first output line of the DAC 1910 may be connected to the positive (+) terminal of the amplifier 1905, and the DAC 1910 may apply the voltage $V_b$ to the first output line. The gate of the FET 1904 may be connected to the output terminal of the amplifier 1905. Since the FET 1904 and the amplifier 1905 are connected in a feedback structure, the output voltage $V_b$ of the DAC 1910 may be applied to the node 1903. Thus, the current $I_{ref}=(V_{DD}-V_b)/R_{ref}$ may flow to the reference electrode 1941.

According to an embodiment of the disclosure, the reference electrode 1941 may be set to be the electrode farthest away from the target electrode for measurement. For example, when the area where the home button is displayed is positioned at the bottom of the display, the electronic device 101 may set the uppermost electrode of the sensor layer as the reference electrode, and when a menu for detecting pressure is positioned at the top of the display, the electronic device 101 may set the lowermost electrode of the sensor layer as the reference electrode.

The DAC 1910 may apply the voltage $V_a$ to the second output line, and the voltage $V_a$ may be applied to the positive (+) terminal of the amplifier 1907. The output terminal of the amplifier 1907 may be connected to the gate of the FET 1906, the negative (−) terminal of the amplifier 1907 may be connected to the node 1908, and the node 1908 may be connected with the source of the FET 1906 and one terminal of the target electrode 1949. Since the FET 1906 and the amplifier 1907 are connected in a feedback structure, the output voltage $V_a$ of the DAC 1910 may be applied to the node 1908. The amplifiers 1905 and 1907 and the FETs 1904 and 1906 may form a regulated cascode transistor (TR). The other terminal of the target electrode 1949 may be grounded, and thus, $I_R=V_a/R_a$ may flow from the node 1908 through the target electrode 1949 to the ground. $R_a$ may mean the resistance of the target electrode 1949. $R_a$ may be expressed as $R+\Delta R$ where R is the specific resistance of the target electrode 1949, and $\Delta R$ may be a change in the resistance made as pressure is applied. The current I output from the node 1900 may be $V_a/R_a-(V_{DD}-V_b)/R_{ref}$, and where $R_a$ is the same as $R_{ref}$, the current I may be zero. Although a resistance change is caused by temperature, the reference electrode 1941 and the target electrode 1949 both experience such a resistance change. Thus, the current I output from the node 1900 may remain zero. In other words, when there is no change in the resistance of either one due to, e.g., the pressure being applied, the current I output from the node 1900 may be maintained as zero. Even without application of pressure, the reference electrode 1941 and the target electrode 1949 may be changed in resistance by other factors. In this case, the current I output from the node 1900 might not be zero. The electronic device 101 may keep the current I output from the node 1900 zero while there is no pressure by adjusting the output voltage (at least one of $V_a$ or $V_b$) of the DAC 1910. Here, 'current remains zero' may be appreciated as the current being so tiny that it may be taken as zero.

When a pressure is applied to the target electrode 1949, a difference 1933 may occur between the resistance 1932 of the target electrode 1949 and the resistance 1931 of the reference electrode 1941. For example, a change of $\Delta R$ may be made to the resistance of the target electrode 1949, in which case the current I output from the node 1900 may be $(V_{DD}-V_b)\Delta R/[R_{ref}(R_a-\Delta R)]$. Since the current I is not zero, the capacitor 1921 is charged, and its corresponding voltage may undergo sampling-and-holding and then analog-to-digital conversion. The voltage $V_{gnd}$ may be applied to the positive (+) terminal of the amplifier 1920, and the negative (−) terminal of the amplifier 1920 may be connected to the node 1900. Thus, when a pressure is applied, the voltage $V_{AMP\_OUT}$ at the output terminal of the amplifier 1920 may be increased (I Xt/$C_{INT}$) over time as shown in the graphs

1933 and 1934 on the right of FIG. 19. $C_{INT}$ may be the capacitance of the capacitor 1921. As the slope of the graphs 1933 and 1934 increases, the resistance change (ΔR) may be interpreted as increasing. Meanwhile, as described above, the amplifier 1920, the capacitor 1921, and the switch 1922 may also be used while measuring the position of the touch. The switch 1922 may be used for resetting.

Figure 20:
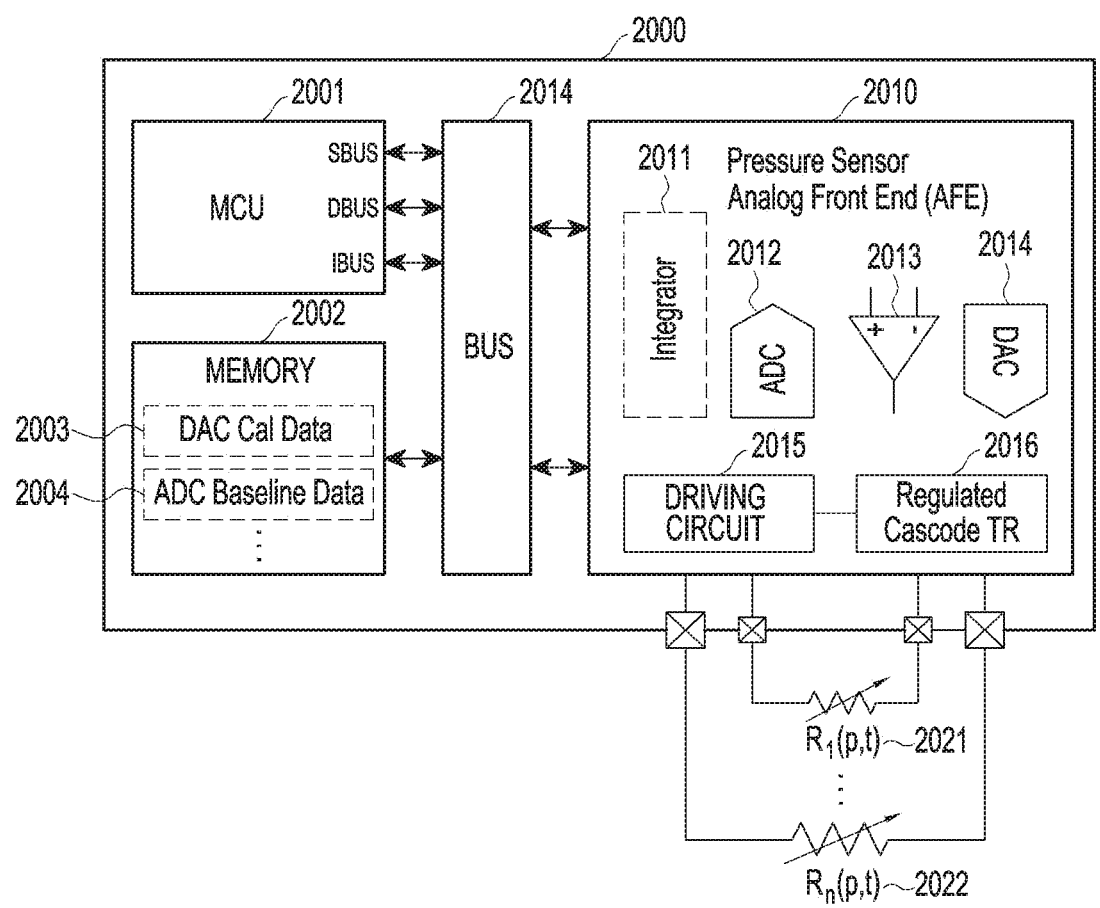
FIG. 20 is a block diagram illustrating a control circuit according to an embodiment of the disclosure.

FIG. 20 is a block diagram illustrating a control circuit according to an embodiment of the disclosure.

Referring to FIG. 20, according to an embodiment of the disclosure, a control circuit 2000 (e.g., the control circuit 360) may include an MCU 2001, a memory 2002, a bus 2014, and an analog-front-end circuit 2010. The memory 2002 may store DAC calibration data (DAC cal data) 2003 and ADC baseline data 2004. The MCU 2001 may receive data from the memory 2002 through various interfaces SBUS, DBUS, and IBUS and the bus 2014 and output control signals to the analog-front-end circuit 2010. The MCU 2001 may adjust the magnitude of the voltage output from the DAC 2014 based on the DAC cal data 2003, and when no pressure is applied, no current may thus be applied to the integrator 2011. Further, the MCU 2001 may set the baseline of the ADC 2012 based on the ADC baseline data 2004. The analog-front-end circuit 2010 may include at least one amplifier 2013 and a regulated cascode transistor (TR) 2016 as shown in FIG. 19. The analog-front-end circuit 2010 may include a driving circuit 2015. Upon measuring pressure, both terminals of the reference electrode 2021 may be connected to the analog-front-end circuit 2010, and both terminals of the target electrode 2022 may be connected to the analog-front-end circuit 2010. The MCU 2001 may identify the magnitude of pressure based on the parameter corresponding to the difference between the resistance $R_1(p, t)$ of the reference electrode 2021 and the resistance $R_2(p,t)$ of the target electrode 2022.

Figure 21:
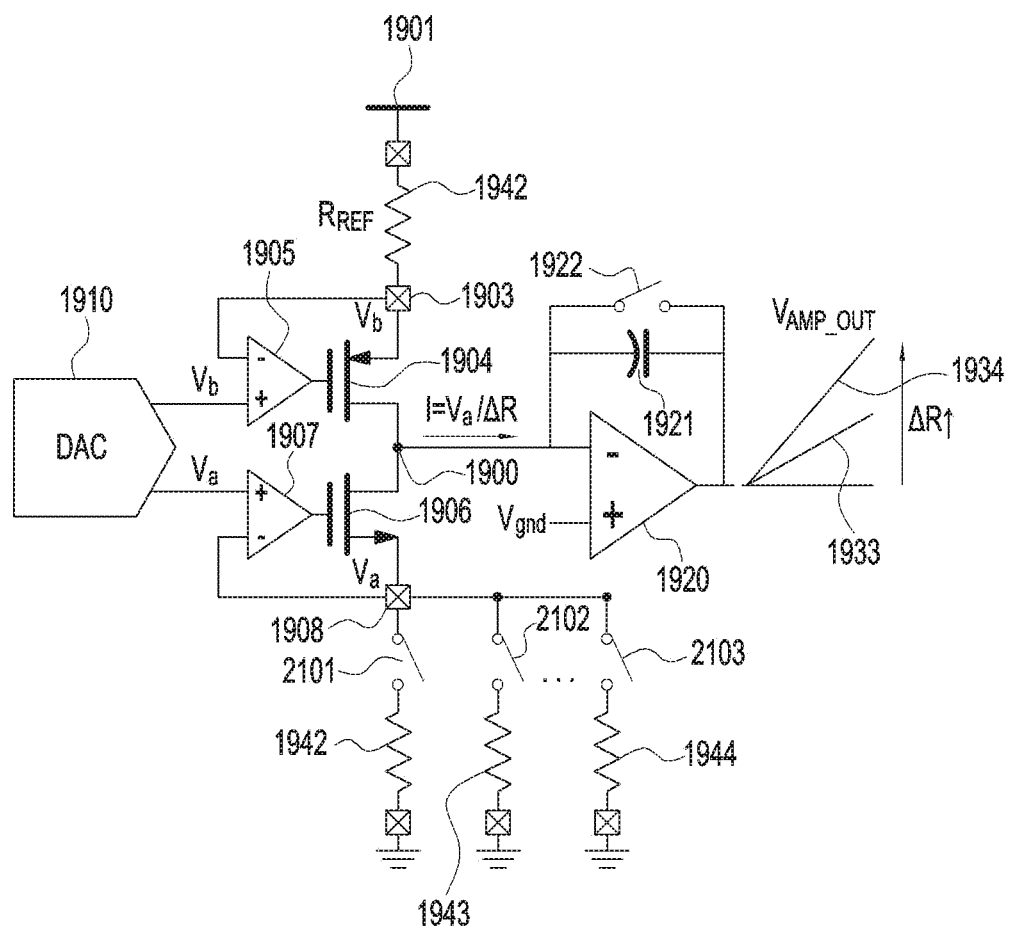
FIG. 21 is a block diagram illustrating a control circuit according to an embodiment of the disclosure.

FIG. 21 is a block diagram illustrating a control circuit according to an embodiment of the disclosure.

Referring to FIG. 21, according to an embodiment of the disclosure, the reference electrode 1941 may previously be set. According to an embodiment of the disclosure, the electronic device 101 may include switches 2101, 2102, and 2103 for connecting at least one of a plurality of electrodes 1942, 1943, and 1944, as a target electrode, to the control circuit but rather than measuring the resistance of a fixed target electrode. According to an embodiment of the disclosure, the electronic device 101 may control the turn-on/off of the switches 2101, 2102, and 2103 to connect only the electrode corresponding to the position of the touch, as the target electrode, to the node 1908. The electronic device 101 may control the turn-on/off of the switches 2101, 2102, and 2103 to sequentially connect each of the switches to the control circuit.

Figure 22A:
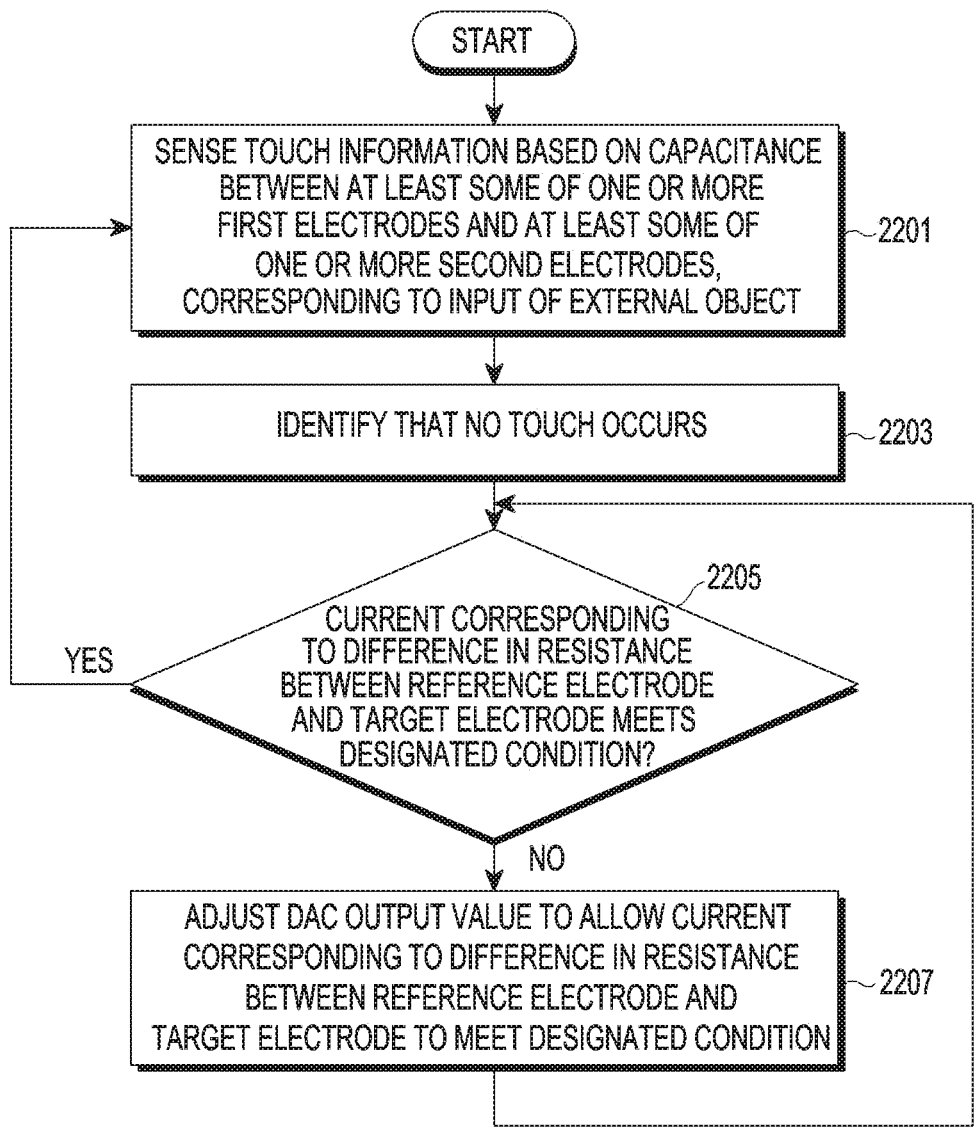
FIGS. 22A and 22B are flowcharts illustrating a method for operating an electronic device according to various embodiments of the disclosure.
Figure 22B:
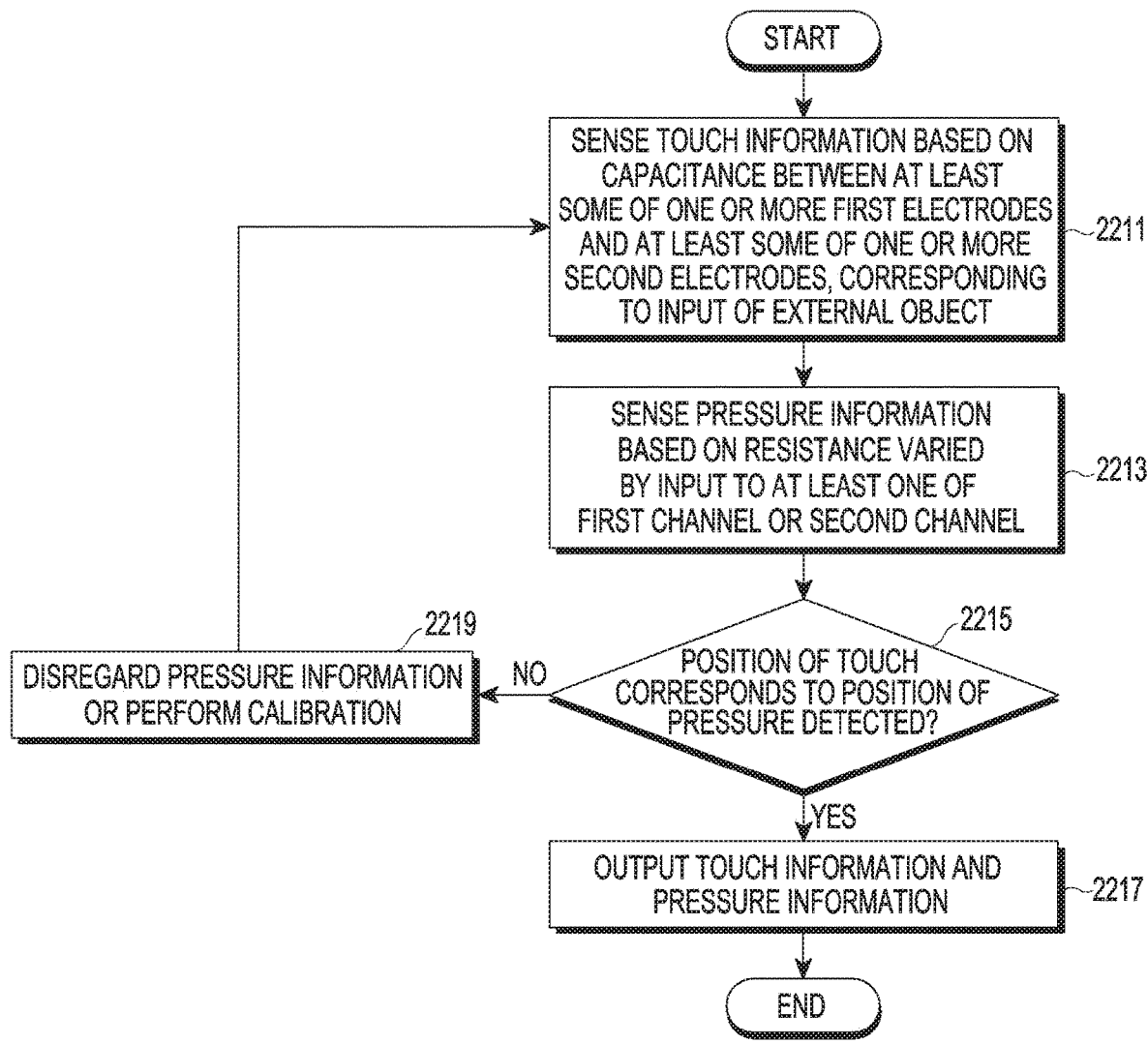

FIGS. 22A and 22B are flowcharts illustrating a method for operating an electronic device according to various embodiments of the disclosure.

Referring to FIG. 22A, according to an embodiment of the disclosure, the electronic device 101 (e.g., the control circuit 360), in operation 2201, may detect touch information based on the capacitance between at least one of one or more first electrodes and at least one of one or more second electrodes corresponding to an input of an external object. In operation 2203, the electronic device 101 may identify that no touch occurs. In operation 2205, the electronic device 101 may determine whether the current corresponding to the difference in resistance between the reference electrode and the target electrode meets a designated condition. For example, the electronic device 101 may determine whether the current I output from the node 1900 of FIG. 19 remains zero. Upon determining that the designated condition is not met, the electronic device 101 may, in operation 2207, adjust the DAC output value to allow the current corresponding to the difference in resistance between the reference electrode and the target electrode to meet the designated condition. For example, the electronic device 101 may adjust the DAC output value to allow the current I output from the node 1900 of FIG. 19 to remain zero.

Referring to FIG. 22B, the electronic device 101 (e.g., the control circuit 360), in operation 2211, may detect touch information based on the capacitance between at least one of one or more first electrodes and at least one of one or more second electrodes corresponding to an input of an external object. In operation 2213, the electronic device 101 may detect pressure information based on the resistance changed by the input to at least one of the first channel or the second channel. In operation 2215, the electronic device 101 may determine whether the position where the touch occurs corresponds to the position where the pressure is detected. Upon determining that the position where the touch occurs corresponds to the position where the pressure is detected, the electronic device 101 may output the touch information and pressure information in operation 2217. Upon determining that the position where the touch occurs does not correspond to the position where the pressure is detected, the electronic device 101 may disregard the pressure information or perform calibration in operation 2219. For example, the electronic device 101 may adjust the DAC output value to allow the current I output from the node 1600 of FIG. 19 to remain zero.

Figure 23:
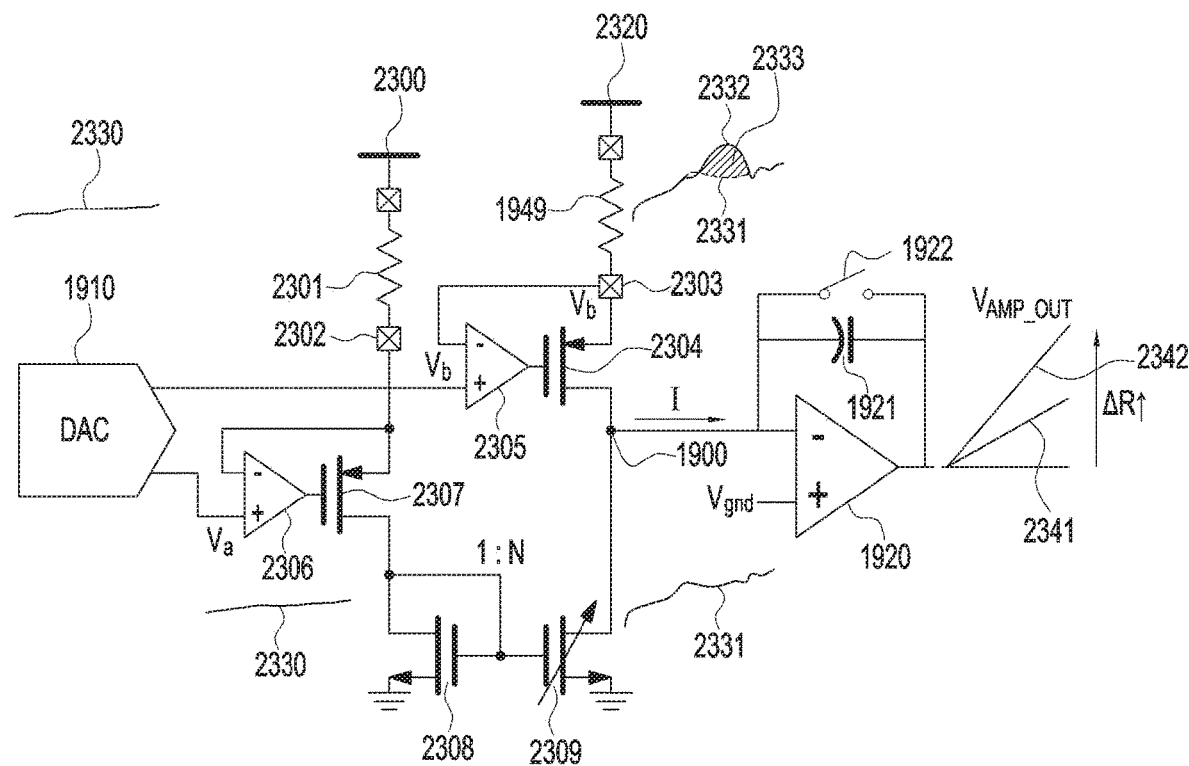
FIG. 23 is a view illustrating a control circuit according to an embodiment of the disclosure.

FIG. 23 is a view illustrating a control circuit according to an embodiment of the disclosure.

Referring to FIG. 23, according to an embodiment of the disclosure, the electronic device 101 may include a circuit for compensating for differences in resistance over temperature between two electrodes with different shapes and thus different temperature coefficients. The DAC 1910 may apply the voltages $V_a$ and $V_b$ to the amplifier 2305 and the amplifier 2306. The respective output terminals of the amplifier 2305 and the amplifier 2306 may be connected to the FET 2304 and the FET 2307, respectively. One terminal of the reference electrode 2301 may be connected to the voltage application terminal 2300, and the other terminal of the reference electrode 2031 may be connected to the node 2302. The node 2302 may be connected to the source of the FET 2307 and the negative (−) terminal of the amplifier 2306. The drain of the FET 2307 may be connected to the drain of the FET 2308 and the gate of the FET 2308. The gate of the FET 2308 may be connected to the gate of the FET 2309, and the source of the FET 2308 may be grounded. The drain of the FET 2309 may be connected to the drain of the FET 2304, and the source of the FET 2309 may be grounded. The electrode 2301 may be an electrode corresponding to, e.g., the edge of the display, and may have a different temperature coefficient than the target electrode 1949, as it is different in shape than the target electrode 1949. For example, as temperature varies, the change in the resistance 2330 of the electrode 2301 may be different from the change in the resistance 2331 of the target electrode 1949.

According to an embodiment of the disclosure, the channel property of the FET 2309 may be changed. For example, the electronic device 101 may change the channel property, e.g., channel width, of the FET 2309, and thus, the current output through the drain of the FET 2309 may be N times as large as the input current. The FET 2308 and the FET 2309 may form a current mirror and the output current may be thereby controlled. Thus, the resistance change characteristic over temperature may be calibrated to correspond to the resistance change characteristic over time of the target electrode (e.g., the electrode 1949). The voltage application terminal 2320 may be connected to one terminal of the target electrode (e.g., the electrode 1949), and the node 2303 may be connected to the other terminal of the target electrode. The voltage $V_b$ may be applied to the node 2303 and be connected to the negative (−) terminal of the amplifier 2305 and the source of the FET 2304. When pressure is not applied, the current I output from the node 1900 connected to the drain of the FET 2304 and the source of the FET 2309 may remain zero, and this is why the current was increased by the current mirror. Additionally, the current output from the node 1900 may be adjusted to be less than a threshold by adjusting the output voltage (at least one of $V_a$ or $V_b$) of the DAC 1910.

When a pressure is applied to the target electrode (e.g., the electrode 1949), the resistance 2332 of the target electrode (e.g., the electrode 1949) may be changed, and a difference 2333 may be caused between the resistance 2332 and the resistance 2331 determined after temperature compensation. Thus, the current I output from the node 1900 might not be zero, and the electronic device 101 may identify the magnitude of pressure based on the graphs 2341 and 2342 that result from the integration of the current I.

Figure 24:
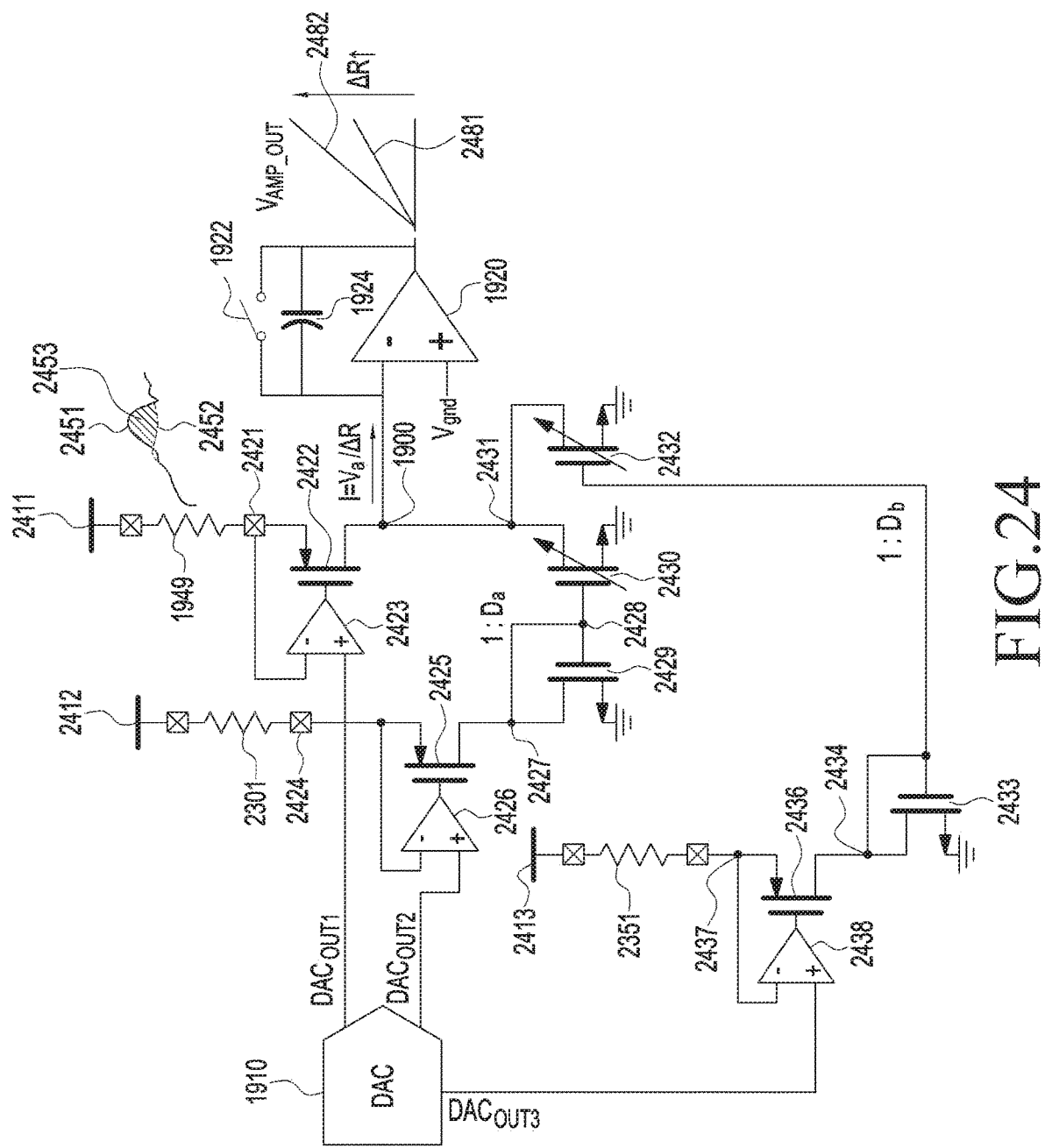
FIG. 24 is a view illustrating a control circuit according to an embodiment of the disclosure.

FIG. 24 is a view illustrating a control circuit according to an embodiment of the disclosure.

Referring to FIG. 24, according to an embodiment of the disclosure, the electronic device 101 may include a plurality of first-type electrodes (e.g., 1649) and second-type electrodes 2301 and 2351. For example, the second-type electrodes 2301 and 2351 may be arranged along the edge of the display and may be different in shape from the first-type electrodes (e.g., 1949). The second-type electrodes 2301 and 2351 may be suited as a reference electrode as they are not frequently touched. However, the second-type electrodes 2301 and 2351 may exhibit a different resistance change characteristic over temperature from the first-type electrodes due to their difference in shape from the target electrode (e.g., the electrodes 1949). For example, the second-type electrodes 2301 and 2351 may be subject to resistance changes as the temperature is changed. When the temperature of the electrode 2351 is $T_a$, and the temperature of the electrode 2301 is $T_b$, the temperature $T_{ref}$ of the target electrode (e.g., the electrode 1949) may be $D_a T_b + D_b T_a)/(D_a + D_b$ according to heat conduction. $D_a$ may be the distance between the electrode 2351 and the target electrode (e.g., the electrode 1949), and $D_b$ may be the distance between the electrode 2301 and the target electrode (e.g., the electrode 1949). Thus, the electronic device 101 may perform temperature compensation by adjusting the magnitude of current in the distance ratio.

The DAC 1910 may output signals $DAC_{out1}$, $DAC_{out2}$, and $DAC_{out3}$ through three connecting lines. The $DAC_{out1}$ may be applied to the positive (+) terminal of the amplifier 2423. The node 2421 may be connected to the negative (−) terminal of the amplifier 2423 and transistor 2422. The output of the amplifier 2423 may be connected to gate of the transistor 2422. One terminal of the target electrode (e.g., the electrode 1949) may be connected to the node 2421, and a voltage application terminal 2411 may be connected to the other terminal of the target electrode (e.g., the electrode 1949). A voltage application terminal 2412 may be connected to one terminal of a first reference electrode (e.g., the electrode 2301), and the other terminal of the first reference electrode (e.g., the electrode 2301) may be connected to the node 2424. The node 2424 may be connected to the negative (−) terminal of the amplifier 2426 and the source of the FET 2425. The $DAC_{out2}$ may be applied to the positive (+) terminal of the amplifier 2426, and the output terminal of the amplifier 2426 may be connected to the gate of the FET 2425. The drain of the FET 2425 may be connected to the node 2427, the node 2427 may be connected to the drain of the FET 2429 and the node 2428, and the node 2428 may be connected to the gate of the FET 2429 and the gate of the FET 2430. The channel characteristics of the FET 2430 may be changed, and the source of the FET 2429 and the source of the FET 2430 may be grounded. For example, the FET 2430 may be controlled so that the ratio of the magnitude of current input to the node 2427 to the magnitude of current input through the drain of the FET 2430 is $1:D_a$. A voltage application terminal 2413 may be connected to one terminal of the second reference electrode (e.g., the electrode 2051), and the other terminal of the second reference electrode (e.g., the electrode 2351) may be connected to the node 2437. The node 2437 may be connected to the source of the FET 2436 and the negative (−) terminal of the amplifier 2438. The $DAC_{out3}$ may be applied to the positive (+) terminal of the amplifier 2438. The output terminal of the amplifier 2438 may be connected to the gate, and the drain of the FET 2436 may be connected to the node 2434. The node 2434 may be connected to the drain and gate of the FET 2433, and the source of the FET 2433 may be grounded. The gate of the FET 2433 may be connected to the gate of the FET 2432. The source of the FET 2432 may be grounded, and the drain of the FET 2432 may be connected to the node 2431. For example, the FET 2432 may be controlled so that the ratio of the magnitude of current input to the node 2434 to the magnitude of current input to the drain of the FET 2432 is $1:D_b$. Accordingly, the magnitude of pressure may be identified based on the difference 2453 between the resistance 2452 temperature-compensated and the resistance 2451 of the target electrode (e.g., the electrode 1949). The electronic device 101 may identify the magnitude of pressure based on the slope of the voltage graphs 2481 and 2482 corresponding to, e.g., the magnitude of pressure.

According to an embodiment of the disclosure, an electronic device 101 may include a sensor layer and a control circuit. The sensor layer may include a first channel including one or more first electrodes and a second channel including one or more second electrodes. The control circuit may be configured to detect touch information based on the capacitance between at least one of the one or more first electrodes and at least one of the one or more second electrodes, corresponding to an input of an external object to the sensor layer and detect pressure information based on a resistance changed by the input to at least one of the first channel or the second channel, corresponding to the input.

According to an embodiment of the disclosure, the control circuit may be configured to detect the touch information based on the capacitance between the first electrodes and the second electrodes during a first time period as at least part of detecting the touch information and detect the pressure information based on the resistance changed by the input to the at least one channel during a second time period not overlapping the first time period, as at least part of detecting the pressure information.

According to an embodiment of the disclosure, the electronic device 101 may further comprise a resistance measuring circuit configured to measure the resistance changed by the input to at least one of the first channel or the second channel and at least one switch configured to selectively connect at least one of the first channel or the second channel to the resistance measuring circuit, wherein the control circuit may be configured to perform a control to prevent the at least one channel from connecting to the resistance measuring circuit by using the at least one switch as at least part of detecting the touch information and perform a control to allow the at least one channel to the resistance measuring circuit by using the at least one switch and detect the pressure information based on, at least, a signal output from the resistance measuring circuit, as at least part of detecting the pressure information. According to an embodiment of the disclosure, the at least one switch may include switches configured to connect each of both terminals of an electrode corresponding to the at least one channel to the resistance measuring circuit.

According to an embodiment of the disclosure, at least one of the first channel or the second channel may be designated by pre-designated information or set by at least one of an orientation of the electronic device or the touch information.

According to an embodiment of the disclosure, the electronic device 101 may further comprise at least one switch configured to interconnect electrodes corresponding to at least one of the first channel or the second channel, wherein the control circuit may be configured to, as at least part of detecting the pressure information, turn on the at least one switch to interconnect at least one electrodes corresponding to the at least one channel and detect the pressure information based on a change in resistance of the interconnected electrodes corresponding to the at least one channel.

According to an embodiment of the disclosure, the electronic device 101 may further comprise a substrate layer and a display circuit disposed on the substrate and configured to support the sensor layer. The at least one switch may be disposed on the substrate layer.

According to an embodiment of the disclosure, the control circuit may be configured to, as at least part of detecting the touch information, turn off the at least one switch to prevent the at least one electrode from connecting to each other.

According to an embodiment of the disclosure, the control circuit may be configured to, as at least part of detecting the pressure information, detect the pressure information based on a parameter corresponding to the difference in resistance between a target electrode and a reference electrode of the first channel and the second channel.

According to an embodiment of the disclosure, the control circuit may be configured to, as at least part of detecting the pressure information and upon identifying the difference in resistance between the target electrode and the reference electrode while no touch is made, disregard the detected pressure information or re-detect pressure information after performing a control to allow the target electrode to be the same in resistance as the reference electrode.

According to an embodiment of the disclosure, a method for operating an electronic device including a sensor layer including a first channel including one or more first electrodes and a second channel including one or more second electrodes may comprise detecting touch information based on a change in capacitance between at least one of the one or more first electrodes and at least one of the one or more second electrodes, corresponding to an input of an external object to the sensor layer and detecting pressure information based on a resistance changed by the input to at least one of the first channel or the second channel, corresponding to the input.

According to an embodiment of the disclosure, detecting the touch information may include detecting the touch information based on the capacitance between the first electrodes and the second electrodes during a first time period, and detecting the pressure information may include detecting the pressure information based on the resistance changed by the input to the at least one channel during a second time period not overlapping the first time period.

According to an embodiment of the disclosure, the electronic device may further include a resistance measuring circuit configured to measure the resistance changed by the input to at least one of the first channel or the second channel and at least one switch configured to selectively connect at least one of the first channel or the second channel to the resistance measuring circuit, wherein detecting the touch information may include performing a control to prevent the at least one channel from connecting to the resistance measuring circuit by using the at least one switch, and detecting the pressure information may include performing a control to allow the at least one channel to the resistance measuring circuit by using the at least one switch and detect the pressure information based on, at least, a signal output from the resistance measuring circuit.

According to an embodiment of the disclosure, at least one of the first channel or the second channel may be designated by pre-designated information or set by at least one of an orientation of the electronic device or the touch information.

According to an embodiment of the disclosure, detecting the pressure information may include detecting the pressure information based on a parameter corresponding to the difference in resistance between a target electrode and a reference electrode of the first channel and the second channel.

According to an embodiment of the disclosure, detecting the pressure information may include, upon identifying the difference in resistance between the target electrode and the reference electrode while no touch is made, disregarding the detected pressure information or re-detecting pressure information after performing a control to allow the target electrode to be the same in resistance as the reference electrode.

According to an embodiment of the disclosure, an electronic device 101 may comprise a sensor layer including a plurality of electrodes and a control circuit configured to detect touch information based on the capacitance between adjacent electrodes corresponding to an input of an external object to the sensor layer among the plurality of electrodes and detect pressure information in a position of a target electrode based on the difference in resistance between a reference electrode among the plurality of electrodes and the target electrode among the plurality of electrodes, the target electrode corresponding to the input. A resistance change characteristic corresponding to a change in temperature of the target electrode may be substantially the same as a resistance change characteristic corresponding to a change in temperature of the reference electrode.

According to an embodiment of the disclosure, the control circuit may include a resistance measuring circuit configured to output a current when a difference in resistance occurs between the reference electrode and the target electrode, an integrator configured to accumulate the current output from the resistance measuring circuit, and an ADC configured to convert a voltage corresponding to the accumulated current into a digital value, and the control circuit may be configured to detect the pressure information based on the digital value output from the ADC.

According to an embodiment of the disclosure, the resistance measuring circuit may include at least one transistor connected with the reference electrode and the target electrode and a digital-to-analog converter (DAC) configured to apply a first voltage and a second voltage to the at least one transistor, and the control circuit may be configured to identify the pressure information based on a magnitude of a current output from the at least one transistor.

According to an embodiment of the disclosure, the control circuit may be configured to adjust the first voltage and the second voltage output from the DAC to prevent the at least one transistor from outputting a current when no touch is made.

The electronic device according to various embodiments may be one of various types of electronic devices. The electronic devices may include, e.g., a portable communication device (e.g., a smartphone), a computer device, a portable multimedia device, a portable medical device, a camera, a wearable device, or a home appliance. According to an embodiment of the disclosure, the electronic device is not limited to the above-listed embodiments.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program products may be traded as commodities between sellers and buyers. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

As is apparent from the foregoing description, according to various embodiments of the disclosure, there may be provided an electronic device capable of detecting the position of a touch based on mutual capacitance between electrodes and detect the pressure of the touch based on a change in the resistance of at least one and a method for operating the electronic device. It is thus possible to measure the position and pressure of a touch without any separate pressure detecting layer.

According to various embodiments of the disclosure, there may be provided an electronic device capable of detecting the position of a touch based on mutual capacitance between electrodes and measuring changes in the resistance of electrodes based on the parameter corresponding to the difference in resistance between two electrodes, free from variables that result from temperature and a method for operating the same. It is thus possible to more accurately measure pressure by eliminating variables attributed to temperature which causes a resistance change.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a sensor layer comprising:
a first channel including first electrodes, and
a second channel including second electrodes; and
a control circuit configured to:
detect touch information corresponding to an input of an external object to the sensor layer during a first time period based on a change in capacitance between at least one first electrode of the first electrodes and at least one second electrode of the second electrodes, wherein the touch information includes a position of the input with respect to the sensor layer, and
based on detecting the touch information, detect pressure information corresponding to the input during a second time period not overlapping with the first time period, based on a difference between a resistance of a target electrode corresponding to the position of the input and a resistance of an electrode different from the target electrode, among the first electrodes and the second electrodes, in response to the input to at least one channel of the first channel or the second channel.

2. The electronic device of claim 1, further comprising:
a resistance measuring circuit configured to measure a resistance changed by the input to the at least one channel of the first channel or the second channel, and
at least one switch configured to selectively connect the at least one channel of the first channel or the second channel to the resistance measuring circuit,
wherein the control circuit is further configured to:
as at least part of the detecting of the touch information, control to prevent the at least one channel of the first channel or the second channel from connecting to the resistance measuring circuit using the at least one switch, and
as at least part of the detecting of the pressure information, control to connect the at least one channel of the first channel or the second channel to the resistance measuring circuit using the at least one switch and detect the pressure information based on, at least, a signal output from the resistance measuring circuit.

3. The electronic device of claim 2, wherein the at least one switch includes switches configured to electrically connect each of both terminals of an electrode corresponding to the at least one channel of the first channel or the second channel to the resistance measuring circuit.

4. The electronic device of claim 1, wherein the at least one channel of the first channel or the second channel is designated by pre-designated information or set by at least one of an orientation of the electronic device or the touch information.

5. The electronic device of claim 1, further comprising:
at least one switch configured to interconnect electrodes corresponding to the at least one channel of the first channel or the second channel,
wherein the control circuit is further configured to:
as at least part of detecting the pressure information, turn on the at least one switch to interconnect the electrodes corresponding to the at least one channel of the first channel or the second channel, and
detect the pressure information based on a change in resistance of the interconnected electrodes corresponding to the at least one channel of the first channel or the second channel.

6. The electronic device of claim 5, further comprising:
a substrate layer; and
a display circuit disposed on the substrate layer to support the sensor layer, wherein the at least one switch is disposed on the substrate layer.

7. The electronic device of claim 5, wherein the control circuit is further configured to, as at least part of the detecting of the touch information, turn off the at least one switch to prevent the electrodes corresponding to the at least one channel of the first channel or the second channel from connecting.

8. The electronic device of claim 1, wherein the control circuit is further configured to, as at least part of the detecting of the pressure information, detect the pressure information based on a parameter corresponding to the difference between the resistance of target electrode and the resistance of the electrode different from the target electrode.

9. The electronic device of claim 8, wherein the control circuit is further configured to, as at least part of the detecting of the pressure information, upon identifying the difference between the resistance of the target electrode and the resistance of the electrode different from the target electrode while no touch is made, disregard the detected pressure information or re-detect pressure information after controlling to allow the target electrode to be same in resistance as the electrode different from the target electrode.

10. A method for operating an electronic device, the electronic device comprising a sensor layer, the sensor layer including a first channel and a second channel, the first channel including first electrodes and the second channel including second electrodes, the method comprising:
detecting touch information corresponding to an input of an external object to the sensor layer during a first time period based on a change in capacitance between at least one first electrode of the first electrodes and at least one second electrode of the second electrodes, wherein the touch information includes a position of the input with respect to the sensor layer; and
based on detecting the touch information, detecting pressure information corresponding to the input during a second time period not overlapping with the first time period based on a difference between a resistance of a target electrode corresponding to the position of the input and a resistance of an electrode different from the target electrode, among the first electrodes and the second electrodes, in response to the input to at least one channel of the first channel or the second channel.

11. The method of claim 10,
wherein the electronic device further comprises:
a resistance measuring circuit configured to measure a resistance changed by the input to the at least one channel of the first channel or the second channel, and
at least one switch configured to selectively connect the at least one channel of the first channel or the second channel to the resistance measuring circuit,
wherein the detecting of the touch information comprises:
controlling to prevent the at least one channel of the first channel or the second channel from connecting to the resistance measuring circuit using the at least one switch, and
wherein the detecting of the pressure information comprises:

controlling to connect the at least one channel of the first channel or the second channel to the resistance measuring circuit using the at least one switch and detecting the pressure information based on, at least, a signal output from the resistance measuring circuit.

12. The method of claim 10, wherein the at least one channel of the first channel or the second channel is designated by pre-designated information or set by at least one of an orientation of the electronic device or the touch information.

13. The method of claim 10, wherein the detecting of the pressure information comprises detecting the pressure information based on a parameter corresponding to the difference between the resistance of the target electrode and the resistance of the electrode different from the target electrode.

14. The method of claim 13, wherein the detecting of the pressure information comprises, upon identifying the difference between the resistance of the target electrode and the resistance of the electrode different from the target electrode while no touch is made, disregarding the detected pressure information or re-detecting pressure information after controlling to allow the target electrode to be same in resistance as the electrode different from the target electrode.

* * * * *